(12) United States Patent
Li et al.

(10) Patent No.: US 11,747,565 B2
(45) Date of Patent: Sep. 5, 2023

(54) OPTICAL FIBER FILTER AND OPTICAL FIBER AMPLIFIER

(71) Applicant: Huawei Technologies Co., Ltd., Shenzhen (CN)

(72) Inventors: Juhao Li, Beijing (CN); Jinglong Zhu, Beijing (CN); Yongqi He, Beijing (CN); Shengling Wu, Shenzhen (CN); Qiang Guo, Shenzhen (CN); Ruishan Chen, Dongguan (CN); Rui Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/863,100

(22) Filed: Jul. 12, 2022

(65) Prior Publication Data
US 2022/0357515 A1 Nov. 10, 2022

Related U.S. Application Data

(63) Continuation of application No. PCT/CN2021/070312, filed on Jan. 5, 2021.

(30) Foreign Application Priority Data

Jan. 14, 2020 (CN) .......................... 202010039133.5

(51) Int. Cl.
*G02B 6/293* (2006.01)
*G02B 6/02* (2006.01)

(52) U.S. Cl.
CPC ..... *G02B 6/29319* (2013.01); *G02B 6/02123* (2013.01); *G02B 6/02295* (2013.01)

(58) Field of Classification Search
CPC ............ G02B 6/29319; G02B 6/02123; G02B 6/02295; G02B 6/29391; G02B 6/0266;
(Continued)

(56) References Cited

U.S. PATENT DOCUMENTS 6,337,937 B1 1/2002 Takushima et al.
6,400,865 B1 * 6/2002 Strasser ................... G02B 6/14
385/27
(Continued)

FOREIGN PATENT DOCUMENTS

CN 1279770 A 1/2001
CN 1292884 A 4/2001
(Continued)

OTHER PUBLICATIONS

Vengsarkar et al., "Long-period fiber-grating-based gain equalizers," Optics Letters, vol. 21, Issue 5, Total pp. 11 (1996).
(Continued)

*Primary Examiner* — Andrew Jordan
(74) *Attorney, Agent, or Firm* — Leydig, Voit & Mayer, Ltd.

(57) ABSTRACT

An optical fiber filter includes a fiber core, inner cladding, and outer cladding. A refractive index of the fiber core, a refractive index of the inner cladding, and a refractive index of the outer cladding progressively decrease in sequence. The fiber core is configured to transmit at least two mutually different first optical signal modes, the inner cladding is configured to transmit at least two mutually different second optical signal modes, and at least one fiber grating is etched on the fiber core. At least part of optical power of a target first optical signal mode is coupled to only a target second optical signal mode at the fiber grating. The target first optical signal mode is one of the at least two first optical signal modes, and the target second optical signal mode is one of the at least two second optical signal modes.

20 Claims, 11 Drawing Sheets

(58) Field of Classification Search
CPC . G02B 6/03633; H01S 3/0804; H01S 3/1608; H01S 3/06754; H01S 3/0078; H01S 3/06783; H01S 2301/04
See application file for complete search history.

(56) References Cited

U.S. PATENT DOCUMENTS

| | | | |
|---|---|---|---|
| 6,882,776 B2* | 4/2005 | Ovadia | G02B 6/29391 398/87 |
| 6,900,930 B2* | 5/2005 | Ovadia | G02B 6/12007 359/337 |
| 6,950,576 B1 | 9/2005 | Grubsky et al. | |
| 8,000,570 B2* | 8/2011 | Digiovanni | H01S 3/06733 385/27 |
| 8,412,015 B2* | 4/2013 | Digiovanni | H01S 3/094038 385/127 |
| 8,514,484 B2* | 8/2013 | Onaka | H01S 3/13013 359/337.2 |
| 8,947,768 B2* | 2/2015 | Kliner | H01S 3/094007 359/341.1 |
| 9,197,030 B2* | 11/2015 | Bennett | G02B 6/02 |
| 9,673,591 B2* | 6/2017 | Kanskar | G02B 6/02042 |
| 11,567,258 B1* | 1/2023 | Song | H01S 3/06729 |
| 2002/0181105 A1 | 12/2002 | Takushima et al. | |
| 2003/0086155 A1* | 5/2003 | Ovadia | H01S 3/10023 359/344 |
| 2003/0214703 A1* | 11/2003 | Ovadia | G02B 6/12007 359/344 |
| 2010/0027938 A1* | 2/2010 | Digiovanni | H01S 3/094038 385/27 |
| 2010/0034500 A1* | 2/2010 | Digiovanni | H01S 3/0672 385/28 |
| 2011/0292500 A1* | 12/2011 | Onaka | H01S 3/06754 359/341.3 |
| 2013/0301116 A1* | 11/2013 | Kuner | H01S 3/2308 359/341.3 |
| 2014/0036348 A1* | 2/2014 | Bennett | G02B 6/02 385/124 |
| 2014/0063592 A1* | 3/2014 | Ip | H01S 3/06754 359/337.1 |
| 2015/0003772 A1 | 1/2015 | Lionello | |
| 2015/0015939 A1 | 1/2015 | Chang et al. | |
| 2015/0192733 A1 | 7/2015 | Abedin et al. | |
| 2016/0216440 A1* | 7/2016 | Imamura | G02B 6/0288 |
| 2016/0226220 A1 | 8/2016 | Kanskar | |
| 2021/0257802 A1* | 8/2021 | Ono | H01S 3/094003 |
| 2022/0357515 A1* | 11/2022 | Li | G02B 6/29319 |
| 2023/0022687 A1* | 1/2023 | Wu | H04B 10/25 |

FOREIGN PATENT DOCUMENTS

| | | |
|---|---|---|
| CN | 103502771 A | 1/2014 |
| CN | 105022114 B | 6/2018 |
| CN | 109994920 A | 7/2019 |
| CN | 110311731 A | 10/2019 |
| JP | 2003029063 A | 1/2003 |
| WO | 2010057288 A1 | 5/2010 |

OTHER PUBLICATIONS

Andermahr et al., "Optically induced long-period fiber gratings for guided mode conversion in few-mode fibers," Optics Express, vol. 18, Issue 5, Total 10 pages (2010).

Giles et al., "Fiber LPG mode converters and mode selection techique for multimode SDM," IEEE Photonics Technology Letters, vol. 24, No. 21, Total 4 pages, Institute of Electronics Engineers, New York, New York (Nov. 1, 2012).

Fang et al., "Mode add/drop multiplexers of LP02 and LP03 modes with two parallel combinative long-period fiber gratings," Optics Express, vol. 22 No. 10, Total 11 pages (May 19, 2014).

EP/21741756.7, Extended European Search Report, dated May 4, 2023.

* cited by examiner

OPTICAL FIBER FILTER AND OPTICAL FIBER AMPLIFIER

CROSS-REFERENCE TO RELATED APPLICATIONS

This application is a continuation of International Application No. PCT/CN2021/070312, filed on Jan. 5, 2021, which claims priority to Chinese Patent Application No. 202010039133.5, filed on Jan. 14, 2020. The disclosures of the aforementioned applications are hereby incorporated by reference in their entireties.

TECHNICAL FIELD

This application relates to the field of optical fiber communications, and in particular, to an optical fiber filter and an optical fiber amplifier.

BACKGROUND

An optical fiber filter is configured to adjust optical power of an optical signal to implement gain equalization. FIG. 1 shows a structure of a segment of optical fiber 100. The optical fiber filter is formed by cascading a plurality of segments of optical fibers 100.

The optical fiber 100 includes a fiber core 101 and cladding 102. Optical power of an optical signal with a specific wavelength transmitted by the fiber core 101 is coupled to the cladding 102 based on phase matching, to adjust the optical power of the optical signal with the specific wavelength. The optical fiber filter includes the plurality of segments of optical fibers 100 that are cascaded, and the optical fibers 100 of different segments are configured to adjust optical power of optical signals with different wavelengths, to implement gain equalization between the optical signals with the different wavelengths.

However, if the fiber core 101 transmits two or more optical signal modes, optical signals with a same wavelength in a same optical signal mode are coupled to a plurality of optical signal modes supported by the cladding 102, based on phase matching in the optical fiber 100. In this case, optical power of the optical signals is coupled to the plurality of optical signal modes supported by the cladding 102, resulting in uncontrollable adjustment of optical power of the two or more optical signal modes. Thus, an optical fiber filter according to a conventional technology cannot implement gain equalization between the two or more optical signal modes.

SUMMARY

This application provides an optical fiber filter and an optical fiber amplifier, to solve a problem that an existing optical fiber filter cannot implement gain equalization between two or more optical signal modes.

A first aspect of embodiments of this application provides an optical fiber filter, including a fiber core, inner cladding, and outer cladding. The inner cladding is wrapped around an outer peripheral surface of the fiber core. The outer cladding is wrapped around an outer peripheral surface of the inner cladding. A refractive index of the fiber core, a refractive index of the inner cladding, and a refractive index of the outer cladding progressively decrease in sequence. The fiber core is configured to transmit at least two mutually different first optical signal modes, the inner cladding is configured to transmit at least two mutually different second optical signal modes, and at least one fiber grating is etched on the fiber core. At least part of optical power of a target first optical signal mode is coupled to only a target second optical signal mode at the fiber grating. The target first optical signal mode is one of the at least two first optical signal modes, and the target second optical signal mode is one of the at least two second optical signal modes.

With the optical fiber filter illustrated in this aspect, at least part of optical power of one first optical signal mode can be coupled to only one second optical signal mode, and optical power of a same first optical signal mode is not coupled to a plurality of second optical signal modes, thereby effectively ensuring controllable adjustment of the optical power of the first optical signal mode, and effectively implementing gain equalization between different first optical signal modes. Moreover, in the optical fiber filter, the optical power is coupled based on the fiber grating, and the fiber grating has advantages of a simple structure, a small insertion loss, a small volume, low costs, and the like.

According to the first aspect of embodiments of this application, in an optional implementation, the target first optical signal mode and the target second optical signal mode are coupled to satisfy the following formula:

$$|(n_{eff_m} - n_{eff_n})| = \frac{\lambda}{\Lambda},$$

where $n_{eff_m}$ is an effective refractive index of one first optical signal included in the target first optical signal mode, $n_{eff_n}$ is an effective refractive index of one second optical signal included in the target second optical signal mode, $\lambda$ is a wavelength of the first optical signal and the second optical signal, and $\Lambda$ is a grating period of the fiber grating.

According to the first aspect of embodiments of this application, in an optional implementation, the target first optical signal mode and the target second optical signal mode are coupled to satisfy the following formula:

$$90\% < \frac{|(n_{eff_m} - n_{eff_n})| * \Lambda}{\lambda} < 110\%,$$

where $n_{eff_m}$ is an effective refractive index of one first optical signal included in the target first optical signal mode, $n_{eff_n}$ is an effective refractive index of one second optical signal included in the target second optical signal mode, $\lambda$ is a wavelength of the first optical signal and the second optical signal, and $\Lambda$ is a grating period of the fiber grating.

A correspondence is created among the wavelength A, the effective refractive index $n_{eff_m}$ of the first optical signal, the effective refractive index $n_{eff_n}$ of the second optical signal, and the grating period A of the fiber grating based on the formula illustrated above. Based on the correspondence, the fiber grating can be enabled, so that at least part of optical power of the first optical signal with the wavelength A can be coupled to the second optical signal. In this way, the optical fiber filter not only can implement gain equalization between different first optical signal modes, but also can implement gain equalization between different first optical signals. The optical power of the target first optical signal mode can be precisely adjusted, and gain equalization effects are improved.

According to the first aspect of embodiments of this application, in an optional implementation, a plurality of fiber gratings are etched on the fiber core, and grating periods of the fiber gratings are different from each other.

With the optical fiber filter illustrated in this aspect, the plurality of fiber gratings etched on the fiber core have grating periods different from each other, thereby effectively ensuring that different fiber gratings can couple optical power of different first optical signal modes to the inner cladding. In this way, the optical power of the different first optical signal modes is independently adjusted, mutual interference is avoided, and adjustment precision of the optical power of the first optical signal modes is effectively improved.

According to the first aspect of embodiments of this application, in an optional implementation, each of the at least two first optical signal modes corresponds to one different second optical signal mode.

According to the first aspect of embodiments of this application, in an optional implementation, each of the at least two first optical signal modes correspond to one second optical signal mode. In other words, it is also possible that a plurality of different first optical signal modes correspond to a same second optical signal mode, and it is even possible that all the first optical signal modes correspond to a same second optical signal mode.

According to the first aspect of embodiments of this application, in an optional implementation, each of the at least two first optical signal modes except a first optical signal mode corresponding to lowest optical power corresponds to one of the second optical signal modes.

With the optical fiber filter illustrated in this aspect, optical power of one first optical signal mode can be coupled to only one second optical signal mode, and optical power of a same first optical signal mode is not coupled to a plurality of second optical signal modes, thereby effectively ensuring controllable adjustment of the optical power of the first optical signal mode, and effectively implementing gain equalization between different first optical signal modes.

According to the first aspect of embodiments of this application, in an optional implementation, a length of the fiber grating in an axial direction of the fiber core is positively correlated to a value of optical power coupled to the target second optical signal mode.

With the optical fiber filter illustrated in this aspect, to precisely adjust the optical power of the target first optical signal mode for gain equalization, a value of the optical power coupled to the target second optical signal mode needs to be adjusted. As illustrated in this aspect, the value of the optical power coupled to the target second optical signal mode can be adjusted by adjusting the length of the fiber grating in the axial direction of the fiber core.

According to the first aspect of embodiments of this application, in an optional implementation, optical power, of the target first optical signal mode, that has been coupled to the outer cladding is less than optical power, of the target first optical signal mode, that has been coupled to the target second optical signal mode.

For precise adjustment of the optical power of the target first optical signal mode, the optical power of the target first optical signal mode is precisely adjusted by using the outer cladding. Specifically, as illustrated in this aspect, the optical power, of the target first optical signal mode, that has been coupled to the outer cladding is controlled to be less than the optical power, of the target first optical signal mode, that has been coupled to the target second optical signal mode, so that the optical power of the target first optical signal mode is coupled to only the target second optical signal mode, to avoid coupling of the optical power of the target first optical signal mode to the outer cladding as much as possible.

According to the first aspect of embodiments of this application, in an optional implementation, a difference between the refractive index of the inner cladding and the refractive index of the outer cladding is positively correlated to a quantity of the second optical signal modes.

To ensure controllable adjustment of the optical power of the target first optical signal mode, the fiber grating couples at least part of the optical power of the target first optical signal mode only to the target second optical signal mode. A quantity of second optical signal modes supported by the inner cladding needs to be limited. If the quantity of the second optical signal modes supported by the inner cladding is infinite, the optical power of the target first optical signal mode may be coupled to a plurality of second optical signal modes. As a result, adjustment of the optical power of the target first optical signal mode is out of control. As illustrated in this aspect, the quantity of the second optical signal modes supported by the inner cladding can be adjusted by adjusting the difference between the refractive index of the inner cladding and the refractive index of the outer cladding, thereby implementing controllable adjustment of the optical power of the first optical signal mode.

According to the first aspect of embodiments of this application, in an optional implementation, a value of a radius of the inner cladding is positively correlated to the quantity of the second optical signal modes.

As illustrated in this aspect, the quantity of the second optical signal modes supported by the inner cladding can be adjusted by adjusting the value of the radius of the inner cladding, thereby implementing controllable adjustment of the optical power of the first optical signal mode.

A second aspect of embodiments of this application provides an optical fiber amplifier. The optical fiber amplifier includes a pump laser, a wavelength division multiplexer, a gain fiber, and an optical fiber filter. The wavelength division multiplexer is coupled to each of the pump laser and the gain fiber, and the gain fiber is coupled to the optical fiber filter. The wavelength division multiplexer is configured to multiplex pump light from the pump laser and an optical signal. The gain fiber is configured to perform gain amplification on the optical signal from the wavelength division multiplexer to output at least two first optical signal modes. The optical fiber filter is as illustrated in the first aspect, and is not described again.

For scenarios such as medium- to long-distance transmission, ultra-large-capacity mode-division transmission, and ultra-large-capacity wavelength-division transmission, the optical fiber amplifier illustrated in this aspect performs gain equalization on at least two different optical signal modes obtained after gain amplification performed by the gain fiber. The optical fiber amplifier effectively ensures gain equalization between different optical signal modes, and effectively reduces a probability of interruption of optical signal transmission.

DESCRIPTION OF EMBODIMENTS

The following clearly describes technical solutions in embodiments of this application with reference to the accompanying drawings. The described embodiments are merely a part but not all of embodiments of this application. All other embodiments obtained by persons skilled in the art based on embodiments of this application without creative efforts may fall within the protection scope of this application.

Figure 1:
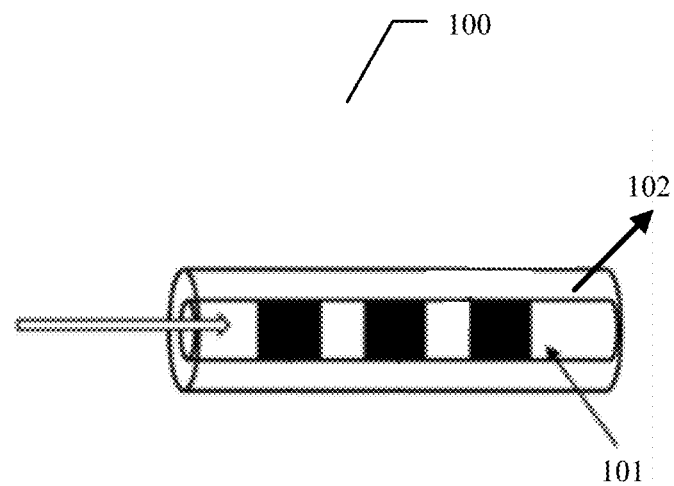
FIG. 1 is a schematic diagram of a structure of a segment of optical fiber included in an optical fiber filter illustrated in a conventional technology.
Figure 2:
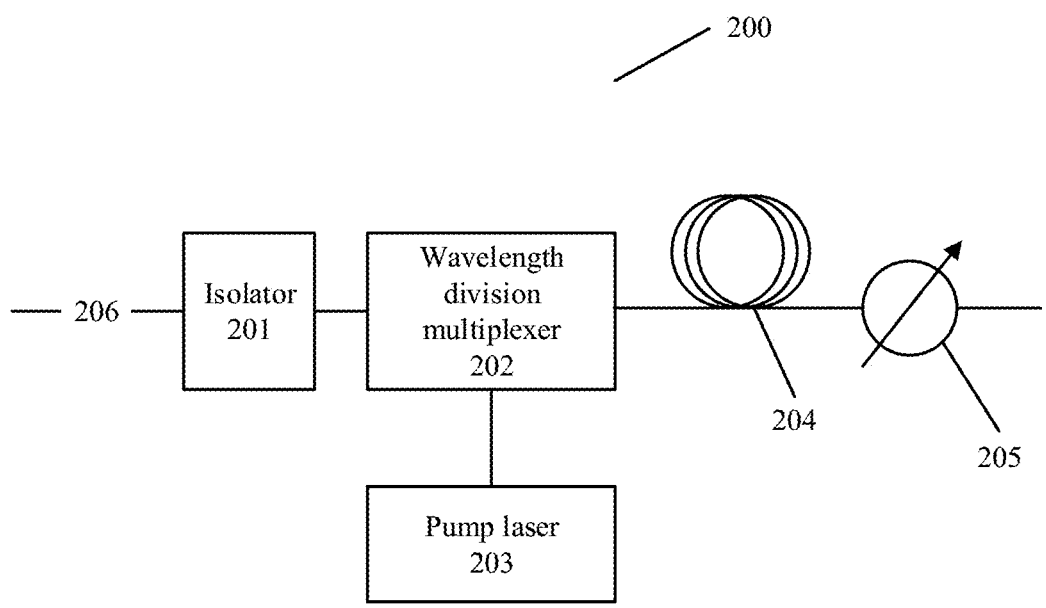
FIG. 2 is an example diagram of a structure of an embodiment of an optical fiber amplifier according to this application.

The following first describes, with reference to FIG. 2, a specific structure of an optical fiber amplifier provided in this application.

The optical fiber amplifier illustrated in this embodiment can support gain amplification of two or more optical signal modes. For example, the optical fiber amplifier is a few-mode erbium-doped fiber amplifier (FM-EDFA). Different optical signal modes have different light intensity distributions.

The optical fiber amplifier 200 includes an isolator 201, a pump laser 203, a wavelength division multiplexer 202, a gain fiber 204, and an optical fiber filter 205. The isolator 201, the wavelength division multiplexer 202, the gain fiber 204, and the optical fiber filter 205 are successively coupled, and the wavelength division multiplexer 202 is also coupled to the pump laser 203.

The isolator 201 is configured to: suppress reflected light from entering an optical fiber 206, and send an optical signal from the optical fiber 206 to the wavelength division multiplexer 202. The wavelength division multiplexer 202 is configured to multiplex an optical signal from the isolator 201 and pump light from the pump laser 203. The gain fiber 204 is configured to perform gain amplification on an optical signal from the wavelength division multiplexer 202 to output at least two different optical signal modes.

For scenarios such as medium- to long-distance transmission, ultra-large-capacity mode-division transmission, and ultra-large-capacity wavelength-division transmission, the gain fiber 204 has different amplification gains for different optical signal modes. This inevitably results in bit errors in a transmission process of an optical signal mode. In this embodiment, gain equalization is performed through the optical fiber filter 205 on the at least two different optical signal modes from the gain fiber 204. The optical fiber filter effectively ensures gain equalization between different optical signal modes, and effectively reduces a probability of interruption of optical signal transmission. In this embodiment, that the optical fiber filter 205 is a gain flattening filter (GFF) is used as an example for illustrative description.

Figure 3:
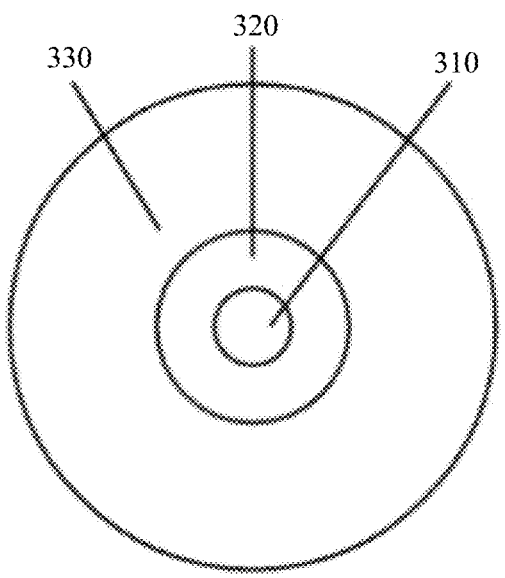
FIG. 3 is a first example diagram of a structure of an optical fiber filter according to this application.

A specific structure of an optical fiber filter is described below with reference to FIG. 3. FIG. 3 is a cross-sectional view of the optical fiber filter in a radial direction of the optical fiber filter.

The optical fiber filter includes a fiber core 310, inner cladding 320, and outer cladding 330 that are arranged successively from inside out. Specifically, the inner cladding 320 is wrapped around an outer peripheral surface of the fiber core 310, and the outer cladding 330 is wrapped around an outer peripheral surface of the inner cladding 320. In the radial direction of the optical fiber filter, in this embodiment, that the fiber core 310, the inner cladding 320, and the outer cladding 330 are all circular is used as an example for illustrative description. In other examples, in the radial direction of the optical fiber filter, one or more of the fiber core 310, the inner cladding 320, and the outer cladding 330 may alternatively be square, oval, irregular, or in another shape. This is not specifically limited in this embodiment.

Specifically, a refractive index of the fiber core 310 is $n_{core}$, a refractive index of the inner cladding 320 is $n_{inner\_clad}$, and a refractive index of the outer cladding 330 is $n_{outer\_clad}$. Herein, $n_{core} > n_{inner\_clad} > n_{outer\_clad}$. The refractive indices of the fiber core 310, the inner cladding 320, and the outer cladding 330 progressively decrease in sequence. The fiber core 310 is used as an example. The refractive index $n_{core}$ of the fiber core 310 specifically means a ratio of a propagation speed of an optical signal in a vacuum to a propagation speed of an optical signal in the fiber core 310.

A radius of the fiber core 310 is $r_{core}$, a radius of the inner cladding 320 is $r_{inner\_clad}$, and a radius of the outer cladding 330 is $r_{outer\_clad}$. Herein, $r_{outer\_clad} > r_{inner\_clad} > r_{core}$. The radii of the fiber core 310, the inner cladding 320, and the outer cladding 330 progressively increase in sequence.

The fiber core 310 illustrated in this embodiment is configured to transmit at least two mutually different first optical signal modes, and the inner cladding 320 is configured to transmit at least two mutually different second optical signal modes. For specific description of the first optical signal modes and the second optical signal modes, refer to the description of the optical signal modes shown in FIG. 2. Details are not described again.

Figure 4:
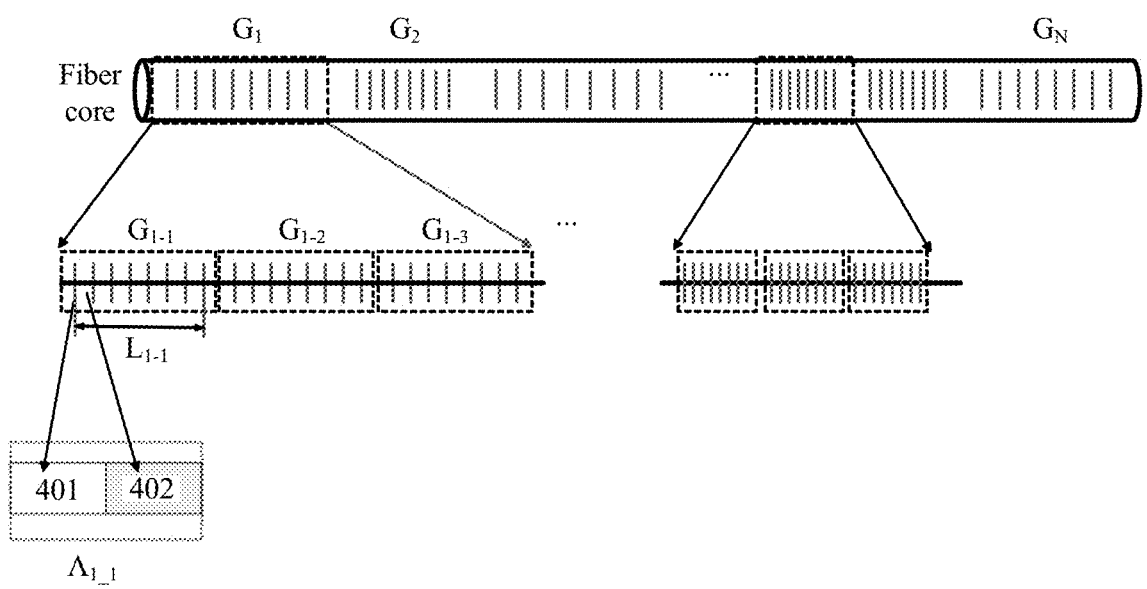
FIG. 4 is a first example diagram of a structure of a fiber core according to this application.

A specific structure of the fiber core 310 is described below with reference to FIG. 4. FIG. 4 is a cross-sectional view of the optical fiber filter in an axial direction of the optical fiber filter.

In the axial direction of the optical fiber filter, a fiber grating is etched on the fiber core through a laser. In this embodiment, that the fiber core is a few-mode fiber (FMF) is used as an example for illustrative description. In other examples, the fiber core may alternatively be a multimode fiber (MMF). It should be noted that, this embodiment does not limit a formation manner of the fiber grating, provided that the fiber grating shown in FIG. 4 can be formed on the fiber core.

Specifically, the fiber core 310 includes N fiber gratings: $G_1, G_2, \ldots,$ and $G_N$, and a specific value of N is not limited in this embodiment, provided that N is a positive integer greater than or equal to 1. Grating periods of the N fiber gratings are different from each other. A length of the fiber grating $G_1$ in the axial direction of the fiber core 310 is $L_1$, and by analogy, a length of the fiber grating $G_N$ in the axial direction of the fiber core 310 is $L_N$.

The fiber grating $G_1$ is used as an example below to describe a specific structure of the fiber grating:

The fiber grating $G_1$ includes a plurality of segments of sub-gratings. This embodiment does not limit a specific quantity of sub-gratings included in each fiber grating. For example, in FIG. 4, the fiber grating $G_1$ specifically includes sub-gratings $G_{1-1}$, $G_{1-2}$, and $G_{1-3}$.

Different sub-gratings may have different grating periods, for example, the sub-grating $G_{1-1}$ has a grating period $\Lambda_{1\_1}$, the sub-grating $G_{1-2}$ has a grating period 1112, the sub-grating $G_{1-3}$ has a grating period $\Lambda_{1\_3}$, and the grating period $\Lambda_{1\_1}$, the grating period $\Lambda_{1\_2}$, and the grating period $\Lambda_{1\_3}$ are different from each other.

It should be noted that, in this embodiment, that different sub-gratings in one fiber grating have different grating periods is used as an example for illustrative description. In other examples, different sub-gratings may alternatively have a same grating period. This is not specifically limited.

The sub-grating $G_{1-1}$ is used as an example below to describe a grating period of the sub-grating:

Specifically, the sub-grating $G_{1-1}$ has M grating periods $\Lambda_{1\_1}$, and the M grating periods $\Lambda_{1\_1}$ of the sub-grating $G_{1-1}$ are all equal. Each grating period $\Lambda_{1\_1}$ includes a refractive index modulated portion 401 and a refractive index unmodulated portion 402. The refractive index modulated portion 401 is a region that has a refractive index changed and that is etched on the fiber core through a laser, so that the modulated portion 401 becomes a refractive index change point. The refractive index unmodulated portion 402 is a region that is adjacent to the refractive index modulated portion 401 and whose refractive index does not change, and a specific value of M is not limited in this embodiment.

Figure 5:
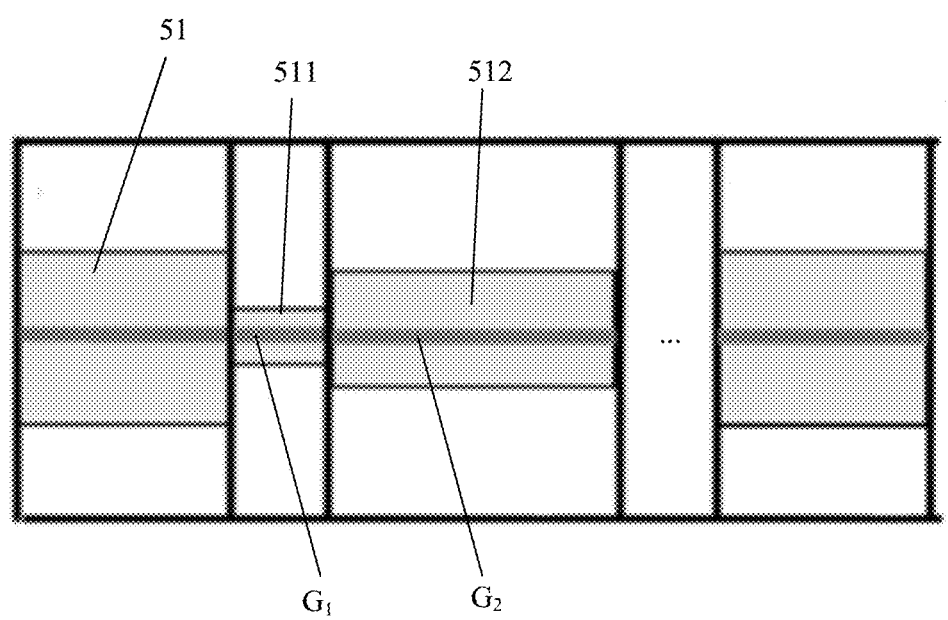
FIG. 5 is a second example diagram of a structure of an optical fiber filter according to this application.

A specific structure of the inner cladding is described below with reference to FIG. 5. FIG. 5 is a cross-sectional view of the optical fiber filter in the axial direction of the optical fiber filter.

The inner cladding 320 illustrated in this embodiment includes at least one segment of sub-cladding 51. This embodiment is illustratively described by using an example that there are a plurality of segments of sub-cladding 51. The plurality of segments of sub-cladding 51 are coaxially arranged and successively connected to constitute the inner cladding 320. A quantity of segments of sub-cladding illustrated in this embodiment is equal to a quantity of fiber gratings described above. When there are a plurality of fiber gratings, a plurality of segments of sub-cladding are wrapped around different fiber gratings respectively.

It should be noted that, that sub-cladding shown in FIG. 5 and configured to be wrapped around different fiber gratings has different radii is used as an example for illustrative description. For example, sub-cladding 511 wrapped around the fiber grating $G_1$ and sub-cladding 512 wrapped around the fiber grating $G_2$ have different radii, and the radius of the sub-cladding 511 is less than the radius of the sub-cladding 512. In other examples, sub-cladding configured to be wrapped around different fiber gratings may alternatively have a same radius.

In this embodiment, a quantity of the second optical signal modes supported by the inner cladding can be adjusted by adjusting a radius of the inner cladding. For example, the quantity of the second optical signal modes supported by the inner cladding can be reduced by reducing the radius of the inner cladding. For example, in FIG. 5, the radius of the sub-cladding 511 is less than the radius of the sub-cladding 512, and a quantity of the second optical signal modes supported by the sub-cladding 511 is less than a quantity of the second optical signal modes supported by the sub-cladding 512.

The fiber core 310 of the optical fiber filter illustrated in this embodiment transmits at least two mutually different first optical signal modes. To implement gain equalization, at least part of optical power of a first optical signal mode needs to be coupled to the inner cladding, to implement gain equalization between two or more first optical signal modes transmitted by the fiber core. Several optional coupling manners for implementing gain equalization are illustratively described as follows.

Coupling Manner 1

Each of the at least two first optical signal modes corresponds to one different second optical signal mode, so that at least part of optical power of each first optical signal mode is coupled to one corresponding second optical signal mode, and second optical signal modes coupled to different first optical signal modes are different from each other.

For example, if the at least two first optical signal modes are LP01 and LP11, at least two second optical signal modes are LP03 and LP12, LP01 corresponds to LP03, and LP11 corresponds to LP12, at least part of optical power of LP01 is coupled to LP03, and at least part of optical power of LP11 is coupled to LP12, to implement gain equalization between LP01 and LP11.

Coupling Manner 2

The at least two first optical signal modes correspond to a same second optical signal mode, so that at least part of optical power of each first optical signal mode is coupled to one corresponding second optical signal mode, and second optical signal modes coupled to different first optical signal modes are the same.

For example, if the at least two first optical signal modes are LP01 and LP11, at least two second optical signal modes are LP03 and LP12, and LP01 and LP11 both correspond to LP03, at least part of optical power of LP01 and at least part of optical power of LP11 are both coupled to LP03, to implement gain equalization between LP01 and LP11.

Coupling Manner 3

Each of the at least two first optical signal modes except a first optical signal mode corresponding to lowest optical power corresponds to one of the second optical signal modes.

For example, if the at least two first optical signal modes are LP01 and LP11, at least two second optical signal modes are LP03 and LP12, and optical power of LP01 is less than optical power of LP11, to implement gain equalization, when only the optical power of LP11 can be adjusted and LP11 corresponds to LP12, only at least part of the optical power of LP11 may be coupled to LP12, to implement gain equalization between LP01 and LP11.

A process of coupling at least part of the optical power of the first optical signal mode to the inner cladding is described as follows.

If optical power of one first optical signal mode is coupled to a plurality of second optical signal modes, a value of the optical power, of the first optical signal mode, coupled to each of the second optical signal modes cannot be adjusted. Consequently, adjustment of the optical power of the first optical signal mode is out of control, and gain equalization between the plurality of first optical signal modes cannot be implemented.

However, with the optical fiber filter illustrated in this embodiment, optical power of one first optical signal mode can be coupled to only one second optical signal mode, and optical power of a same first optical signal mode is not coupled to a plurality of second optical signal modes, thereby effectively ensuring controllable adjustment of the optical power of the first optical signal mode, and effectively implementing gain equalization between different first optical signal modes. A specific implementation process is described as follows.

In this embodiment, at least part of optical power of a target first optical signal mode is coupled only to a target second optical signal mode at a target fiber grating. The target first optical signal mode is one of the at least two first optical signal modes transmitted by the fiber core, the target second optical signal mode is only one of the at least two second optical signal modes transmitted by the inner cladding, and the target fiber grating is one fiber grating included in the fiber core. The target fiber grating can couple at least part of the optical power of the target first optical signal mode only to the target second optical signal mode, thereby effectively avoiding coupling of the target first optical signal mode to a plurality of second optical signal modes, and avoiding out-of-control adjustment of the optical power of the target first optical signal mode.

Specifically, in this embodiment, that the target first optical signal mode is coupled to the target second optical signal mode based on a phase matching condition is used as an example for illustrative description:

Phase Matching Condition 1

A correspondence created based on the phase matching condition is shown in the following formula:

$$|(n_{eff_m} - n_{eff_n})| = \frac{\lambda}{\Lambda}$$

Parameters in the formula are described below:

First, an effective refractive index $n_{eff_m}$ is described: Specifically, the target first optical signal mode includes one or more first optical signals with different wavelengths, and $n_{eff_m}$ is an effective refractive index of one first optical signal included in the first optical signal mode.

Herein, $$n_{eff_m} = \frac{\beta 1 \lambda}{2\pi}.$$

$\beta 1$ is a propagation constant, and is used to represent a phase change of the first optical signal propagating in the fiber core over a unit distance. The wavelength $\lambda$ is a wavelength of the first optical signal.

Then, $n_{eff_n}$ is described: Specifically, the target second optical signal mode includes one or more second optical signals with different wavelengths, and $n_{eff_n}$ is an effective refractive index of one second optical signal included in the second optical signal mode.

Herein, $$n_{eff_n} = \frac{\beta 2 \lambda}{2\pi}.$$

$\beta_2$ is a propagation constant, and is used to represent a phase change of the second optical signal propagating in the inner cladding over a unit distance. The wavelength $\lambda$ is a wavelength of the second optical signal.

To adjust the optical power of the first optical signal mode illustrated in this embodiment, it is required to adjust optical power of each first optical signal included in the first optical signal mode. Specifically, the optical power of the first optical signal may be adjusted by coupling at least part of the optical power of the first optical signal to the second optical signal. To couple the first optical signal to the second optical signal, the wavelength of the first optical signal and the wavelength of the second optical signal are equal, and both are equal to the wavelength $\lambda$.

Next, the grating period $\Lambda$ is described: As shown in FIG. 4, the fiber core illustrated in this embodiment includes a plurality of fiber gratings, and different fiber gratings are configured to adjust optical power of different optical signal modes, so that optical power of different optical signal modes is independently adjusted. One target fiber grating includes a plurality of sub-gratings, and different sub-gratings are configured to adjust optical power of optical signals with different wavelengths, so that optical power of different optical signals is independently adjusted.

When the target fiber grating is configured to adjust optical power of a first optical signal with the wavelength $\lambda$, a grating period of the target fiber grating may be a grating period of a target sub-grating, where the target sub-grating is one segment of sub-grating included in the target fiber grating. Still referring to FIG. 4, if a grating period $\Lambda_{1\_1}$ of a sub-grating $G_{1-1}$ included a fiber grating $G_1$ meets the correspondence shown in the above formula, the sub-grating $G_{1-1}$ is the target sub-grating, and the target sub-grating $G_{1-1}$ is configured to adjust a value of the optical power of the first optical signal.

Phase Matching Condition 2

$$90\% < \frac{|(n_{eff_m} - n_{eff_n})| * \Lambda}{\lambda} < 110\%$$

For description of each parameter shown in the phase matching condition 2, refer to the phase matching condition 1. Details are not described again. In this example, when $$\frac{|(n_{eff_m} - n_{eff_n})| * \Lambda}{\lambda}$$

is less than 110% and greater than 90%, it has been verified that the optical power of the target first optical signal mode can be precisely adjusted, and gain equalization effects are improved. In this embodiment, description of a value range of $$\frac{|(n_{eff_m} - n_{eff_n})| * \Lambda}{\lambda}$$

is an optional example, and is not limited, provided that an optical signal in the target first optical signal mode can be precisely adjusted.

A correspondence is created among the wavelength $\lambda$, the effective refractive index $n_{eff_m}$ of the first optical signal, the effective refractive index $n_{eff_n}$ of the second optical signal, and the grating period $\Lambda$ of the target fiber grating based on the formula shown in the phase matching condition 1 or the phase matching condition 2. Based on the correspondence, the target fiber grating can be enabled, so that at least part of the optical power of the first optical signal with the wavelength λ can be coupled to the second optical signal. In this way, the optical fiber filter not only can implement gain equalization between different first optical signal modes, but also can implement gain equalization between different first optical signals.

To ensure controllable adjustment of the optical power of the target first optical signal mode, the target fiber grating couples at least part of the optical power of the target first optical signal mode only to the target second optical signal mode. The quantity of the second optical signal modes supported by the inner cladding needs to be limited. If the quantity of the second optical signal modes supported by the inner cladding is infinite, the optical power of the target first optical signal mode may be coupled to a plurality of second optical signal modes. As a result, adjustment of the optical power of the target first optical signal mode is out of control. The following describes how to control the quantity of the second optical signal modes supported by the inner cladding:

It should be noted that, several manners for controlling the quantity of the second optical signal modes supported by the inner cladding are provided below. In practical application, one or more of the following manners can be used to control the quantity of the second optical signal modes supported by the inner cladding.

Manner 1

The refractive index of the inner cladding and the refractive index of the outer cladding are controlled, to control the quantity of the second optical signal modes supported by the inner cladding. A difference between the refractive index of the inner cladding and the refractive index of the outer cladding is positively correlated to the quantity of the second optical signal modes supported by the inner cladding.

If the quantity of the second optical signal modes needs to be increased, the difference between the refractive index of the inner cladding and the refractive index of the outer cladding needs to be increased; and if the quantity of the second optical signal modes needs to be reduced, the difference between the refractive index of the inner cladding and the refractive index of the outer cladding needs to be reduced.

Manner 2

A value of the radius of the inner cladding is controlled, to control the quantity of the second optical signal modes supported by the inner cladding. The value of the radius of the inner cladding is positively correlated to the quantity of the second optical signal modes supported by the inner cladding.

If the quantity of the second optical signal modes needs to be increased, the value of the radius of the inner cladding needs to be increased; and if the quantity of the second optical signal modes needs to be reduced, the value of the radius of the inner cladding needs to be reduced.

To precisely adjust the optical power of the target first optical signal mode to implement gain equalization, the optical fiber filter illustrated in this embodiment needs to adjust a value of the optical power coupled to the target second optical signal mode. Specific adjustment manners are described as follows.

It should be noted that, several manners of adjusting the optical power are provided below. In practical application, one or more of the following manners can be used to adjust the optical power.

Adjustment Manner 1

A value of a length of the target fiber grating in the axial direction of the fiber core is adjusted, to adjust the optical power of the target first optical signal mode. The length of the target fiber grating in the axial direction of the fiber core is positively correlated to the value of the optical power coupled to the target second optical signal mode.

Specifically, a process of adjusting one first optical signal of the target first optical signal mode is used as an example for illustrative description. To be specific, a length of a target sub-grating in the axial direction of the fiber core is adjusted, to adjust optical power of the first optical signal. For description of the target sub-grating, refer to FIG. 4. Details are not described again. The length of the target sub-grating is positively correlated to the value of the optical power coupled to the target second optical signal mode. Still referring to FIG. 4, a larger length $L_{1-1}$ of the target sub-grating $G_{1-1}$ in the axial direction of the fiber core leads to larger optical power of the target sub-grating $G_{1-1}$ that is coupled to target second optical signal mode. A smaller length $L_{1-1}$ leads to smaller optical power of the target sub-grating $G_{1-1}$ that is coupled to target second optical signal mode. The length $L_{1-1}$ of the target sub-grating $G_{1-1}$ can be determined by adjusting the value of the optical power of the target first optical signal mode as required.

Adjustment Manner 2

The optical power of the target first optical signal mode is precisely adjusted by using the outer cladding. Specifically, to implement controllable adjustment of the optical power of the target first optical signal mode, the optical power of the target first optical signal mode needs to be coupled only to the target second optical signal mode, and coupling of the optical power of the target first optical signal mode to the outer cladding needs to be avoided as much as possible. Specifically, it is ensured that a first coupling coefficient is less than a second coupling coefficient.

The first coupling coefficient is a ratio of first optical power to second optical power, and the second coupling coefficient is a ratio of third optical power to the second optical power.

The first optical power is optical power, of the target first optical signal mode, that has been coupled to the outer cladding, the second optical power is optical power, of the target first optical signal mode, in an uncoupled state, and the third optical power is optical power, of the target first optical signal mode, that has been coupled to the target second optical signal mode.

A higher degree to which the first coupling coefficient is less than the second coupling coefficient leads to smaller optical power, of the target first optical signal mode, that can be coupled to the outer cladding, thereby effectively ensuring precision of adjustment of the optical power of the target first optical signal mode. For example, if the second coupling coefficient is about 10 times the first coupling coefficient, it indicates that the first coupling coefficient is much less than the second coupling coefficient. In this case, the optical power, of the target first optical signal mode, that has been coupled to the outer cladding is extremely weak, and coupling between the target first optical signal mode and the outer cladding can be ignored, thereby effectively ensuring that the optical power of the target first optical signal mode is coupled only to the target inner cladding, and precisely adjusting the optical power of the target first optical signal mode to implement gain equalization.

Figure 6:
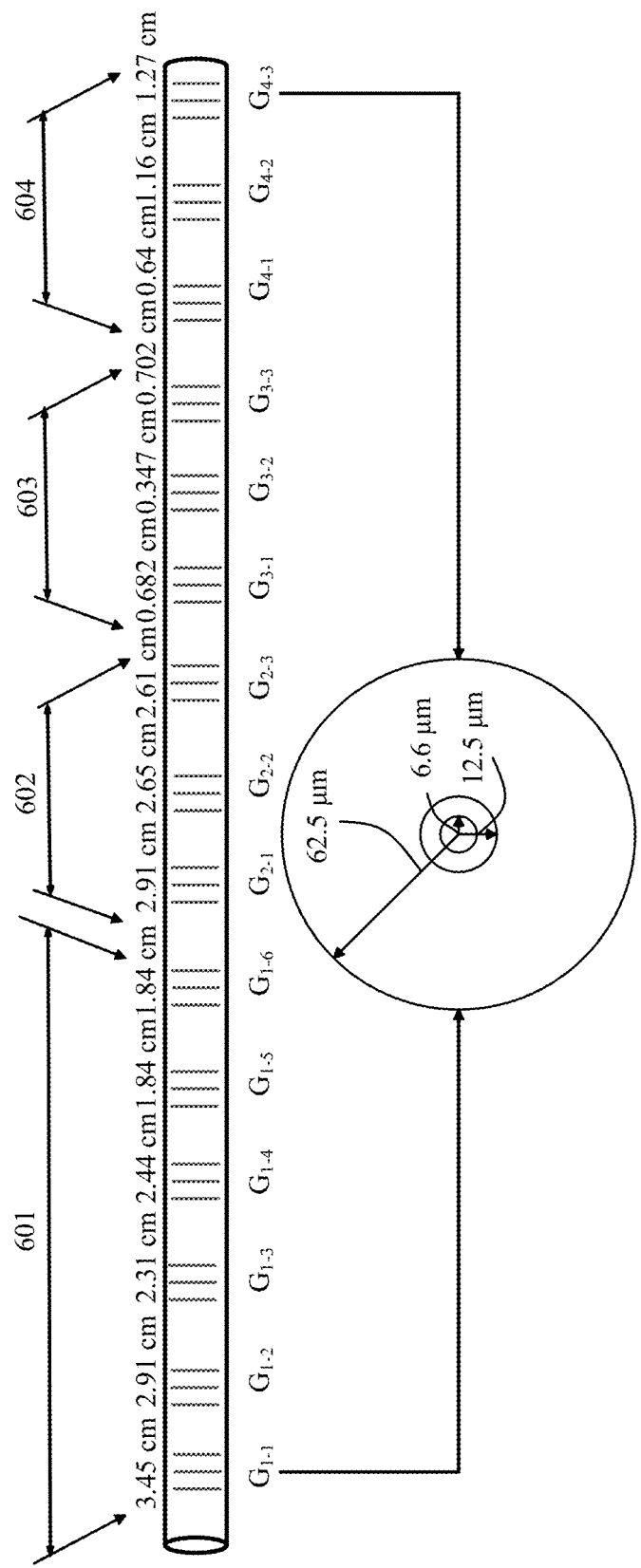
FIG. 6 is a third example diagram of a structure of an optical fiber filter according to this application.

To better understand the optical fiber filter provided in this application, the optical fiber filter is specifically described below in combination with specific application scenarios:

Application Scenario 1:

This application scenario is described with reference to FIG. 6. In this application scenario, for example, a quantity of the first optical signal modes transmitted by the fiber core is equal to a quantity of the second optical signal modes transmitted by the inner cladding. Specifically, the fiber core transmits four first optical signal modes: LP01, LP11, LP21, and LP02. The second optical signal modes transmitted by the inner cladding are LP31, LP12, LP03, and LP22.

In this embodiment, that optical power of different optical signal modes is adjusted based on same structural parameters is used as an example. The structural parameters are as follows: The radius of the fiber core is 6.6 micrometers (μm), the radius of the inner cladding is 12.5 μm, and the radius of the outer cladding is 62.5 μm. The structural parameters are further as follows: The refractive index of the fiber core is 1.45952, the refractive index of the inner cladding is 1.44782, and the refractive index of the outer cladding is 1.44402.

The first optical signal mode LP01 transmitted by the fiber core is coupled to the second optical signal mode LP31 based on phase matching, the first optical signal mode LP11 transmitted by the fiber core is coupled to the second optical signal mode LP12 based on phase matching, the first optical signal mode LP21 transmitted by the fiber core is coupled to the second optical signal mode LP03 based on phase matching, and the first optical signal mode LP02 transmitted by the fiber core is coupled to the second optical signal mode LP22 based on phase matching. Specific coupling manners are described below:

Coupling Manner 1

Coupling of the first optical signal mode LP01 transmitted by the fiber core to the second optical signal mode LP31 is specifically described with reference to FIG. 6 and Table 1.

TABLE 1

| | Sub-grating of the target fiber grating | Λ (cm) | N | L (cm) | Center wavelength (nm) |
|---|---|---|---|---|---|
| Coupling of the first optical signal mode LP01 | $G_{1-1}$ | 0.01209 | 285 | 3.45 | 1530 |
| | $G_{1-2}$ | 0.01212 | 240 | 2.91 | 1535 |
| | $G_{1-3}$ | 0.01215 | 190 | 2.31 | 1540 |
| | $G_{1-4}$ | 0.01218 | 200 | 2.44 | 1545 |
| | $G_{1-5}$ | 0.01224 | 150 | 1.84 | 1555 |
| | $G_{1-6}$ | 0.01224 | 150 | 1.84 | 1555 |

The first optical signal mode LP01 is coupled by using the target fiber grating 601. The first optical signal mode LP01 includes six first optical signals, and center wavelengths of the six first optical signals are 1530 nm, 1535 nm, 1540 nm, 1545 nm, 1555 nm, and 1555 nm, respectively.

The target fiber grating 601 includes six sub-gratings: $G_{1-1}$, $G_{1-2}$, $G_{1-3}$, $G_{1-4}$, $G_{1-5}$, and $G_{1-6}$. Herein, the grating period Λ of the sub-grating $G_{1-1}$ is 0.01209 centimeters (cm), the sub-grating $G_{1-1}$ includes a total of 285 grating periods A, and the length of the sub-grating $G_{1-1}$ in the axial direction of the fiber core is 3.45 cm. The sub-grating can couple at least part of optical power of the first optical signal with the center wavelength of 1530 nm to the second optical signal mode LP31 based on phase matching. For specific description of the phase matching, refer to the foregoing description. Details are not described again. In view of Table 1, by analogy, $G_{1-6}$ can couple at least part of optical power of the first optical signal with the center wavelength of 1555 nm to the second optical signal mode LP31.

Coupling Manner 2

Coupling of the first optical signal mode LP11 transmitted by the fiber core to the second optical signal mode LP12 is specifically described with reference to FIG. 6 and Table 2.

TABLE 2

| | Sub-grating of the target fiber grating | Λ (cm) | N | L (cm) | Center wavelength (nm) |
|---|---|---|---|---|---|
| Coupling of the first optical signal mode LP11 | $G_{2-1}$ | 0.05382 | 54 | 2.91 | 1532 |
| | $G_{2-2}$ | 0.05414 | 49 | 2.65 | 1545 |
| | $G_{2-3}$ | 0.05434 | 48 | 2.61 | 1558 |

The first optical signal mode LP11 is coupled by using the target fiber grating 602. The first optical signal mode LP11 includes three first optical signals, and center wavelengths of the three first optical signals are 1532 nm, 1545 nm, and 1558 nm, respectively.

The target fiber grating 602 includes three sub-gratings: $G_{2-1}$, $G_{2-2}$, and $G_{2-3}$. For description of grating periods of $G_{2-1}$, $G_{2-2}$, and $G_{2-3}$ and quantities of the grating periods, refer to Table 2. Details are not described again. The sub-grating $G_{2-1}$ is used as an example. The sub-grating $G_{2-1}$ is configured to couple at least part of optical power of the first optical signal with the center wavelength of 1532 nm to the second optical signal mode LP12, and by analogy, the sub-grating $G_{2-3}$ is configured to couple at least part of optical power of the first optical signal with the center wavelength of 1558 nm to the second optical signal mode LP12.

Coupling Manner 3

Coupling of the first optical signal mode LP21 transmitted by the fiber core to the second optical signal mode LP03 is specifically described with reference to FIG. 6 and Table 3.

TABLE 3

| | Sub-grating of the target fiber grating | Λ (cm) | N | L (cm) | Center wavelength (nm) |
|---|---|---|---|---|---|
| Coupling of the first optical signal mode LP21 | $G_{3-1}$ | 0.02274 | 30 | 0.682 | 1532 |
| | $G_{3-2}$ | 0.02312 | 15 | 0.347 | 1545 |
| | $G_{3-3}$ | 0.02342 | 30 | 0.703 | 1555 |

The first optical signal mode LP21 is coupled by using the target fiber grating 603. The first optical signal mode LP21 includes three first optical signals, and center wavelengths of the three first optical signals are 1532 nm, 1545 nm, and 1555 nm, respectively.

The target fiber grating 603 includes three sub-gratings: $G_{3-1}$, $G_{3-2}$, and $G_{3-3}$. For description of grating periods of $G_{3-1}$, $G_{3-2}$, and $G_{3-3}$ and quantities of the grating periods, refer to Table 3. Details are not described again. The sub-grating $G_{3-1}$ is used as an example. The sub-grating $G_{3-1}$ is configured to couple at least part of optical power of the first optical signal with the center wavelength of 1532 nm to the second optical signal mode LP03, and by analogy, the sub-grating $G_{3-3}$ is configured to couple at least part of optical power of the first optical signal with the center wavelength of 1555 nm to the second optical signal mode LP03.

Coupling Manner 4

Coupling of the first optical signal mode LP02 transmitted by the fiber core to the second optical signal mode LP22 is specifically described with reference to FIG. 6 and Table 4.

TABLE 4

| Sub-grating of the target fiber grating | Λ (cm) | N | L (cm) | Center wavelength (nm) |
|---|---|---|---|---|
| Coupling of the first optical signal mode LP02 | $G_{4-1}$ | 0.02900 | 22 | 0.64 | 1531 |
| | $G_{4-2}$ | 0.08961 | 12 | 1.16 | 1550 |
| | $G_{4-3}$ | 0.09059 | 14 | 1.27 | 1557 |

The first optical signal mode LP02 is coupled by using the target fiber grating 604. The first optical signal mode LP02 includes three first optical signals, and center wavelengths of the three first optical signals are 1531 nm, 1550 nm, and 1557 nm, respectively.

The target fiber grating 604 includes three sub-gratings: $G_{4-1}$, $G_{4-2}$, and $G_{4-3}$. For description of grating periods of $G_{4-1}$, $G_{4-2}$, and $G_{4-3}$ and quantities of the grating periods, refer to Table 4. Details are not described again. The sub-grating $G_{4-1}$ is used as an example. The sub-grating $G_{4-1}$ is configured to couple at least part of optical power of the first optical signal with the center wavelength of 1531 nm to the second optical signal mode LP22, and by analogy, the sub-grating $G_{4-3}$ is configured to couple at least part of optical power of the first optical signal with the center wavelength of 1557 nm to the second optical signal mode LP22.

In this application scenario, that optical power of different first optical signal modes is coupled to different second optical signal modes is used as an example for illustrative description. It should be noted that, no limitation is imposed herein. For example, alternatively, optical power of a plurality of first optical signal modes may be coupled to a same second optical signal mode, provided that optical power of any first optical signal in any first optical signal mode is coupled to only one second optical signal mode. One second optical signal mode can receive optical power of a plurality of first optical signal modes, and different second optical signal modes cannot receive optical power from a same first optical signal mode.

If the fiber core includes the target fiber grating 601, the target fiber grating 602, the target fiber grating 603, and the target fiber grating 604 that are cascaded, gain equalization of an entire C-band (1530 nm to 1565 nm) can be implemented. That the fiber core shown in this application scenario implements the gain equalization of the entire C-band is used as an example for illustrative description. In other examples, the fiber core can also implement gain equalization of other bands, for example, gain equalization of an L-band.

In this application scenario, gain equalization of a same wavelength in different optical signal modes can also be implemented. For details, refer to Table 5 below:

TABLE 5

| | Target fiber grating | Λ (cm) | N | L (cm) |
|---|---|---|---|---|
| Gain equalization on optical signals with a center wavelength of 1545 nm | $G_1$ | 0.01218 | 200 | 2.44 |
| | $G_2$ | 0.05414 | 49 | 2.65 |
| | $G_3$ | 0.02312 | 15 | 0.347 |
| | $G_4$ | 0.08961 | 12 | 1.16 |

Table 5 is used as an example. The first optical signal modes LP01, LP11, LP21, and LP02 each include an optical signal with the center wavelength of 1545 nm. Optical power of the optical signals with the center wavelength of 1545 nm is adjusted respectively by using the fiber grating $G_1$, the fiber grating $G_2$, the fiber grating $G_3$, and the fiber grating $G_4$, to implement gain equalization of the optical signals with the center wavelength of 1545 nm in the first optical signal modes LP01, LP11, LP21, and LP02.

The target fiber grating shown in this application scenario can adjust optical power of one first optical signal mode, and different target fiber gratings can perform adjustment for different first optical signal modes. Because different target fiber gratings adjust optical power of the different first optical signal modes based on different phase matching, in other words, each target fiber grating can independently adjust the optical power of each first optical signal mode, mutual interference is effectively avoided. Herein, avoiding mutual interference means: In a process of transmitting the first optical signal modes LP01, LP11, LP21, and LP02, when coupling one first optical signal mode, the target fiber grating does not interfere with optical power of other first optical signal modes transmitted by the target fiber grating. For better description of the idea that the optical fiber filter shown in this application scenario can effectively avoid mutual interference, refer to simulation examples shown below in detail:

Simulation Example 1

This simulation example is shown in combination with the foregoing coupling manner 1: The first optical signal mode LP01 transmitted by the fiber core is coupled to the second optical signal mode LP31. Specifically, in this simulation example, simulation is performed based on different values of the quantity N of grating periods of the target fiber grating 601. For description of the quantity N of grating periods, refer to the coupling manner 1. Details are not described again. This simulation example does not limit a sub-grating including the quantity N of grating periods. For example, a sub-grating including the quantity N of grating periods may be one or more of $G_{1-1}$, $G_{1-2}$, $G_{1-3}$, $G_{1-4}$, $G_{1-5}$, and $G_{1-6}$.

Optionally, in this simulation example, that the quantity N of grating periods is set to a value in a range from 40 to 400 is used as an example. For example, if the quantity N of grating periods is set to values progressively increasing at an interval of 40 in this range, the quantity N of grating periods is separately set to 40, 80, 120, 160, 200, 240, 280, 320, 360, and 400.

Figure 7:
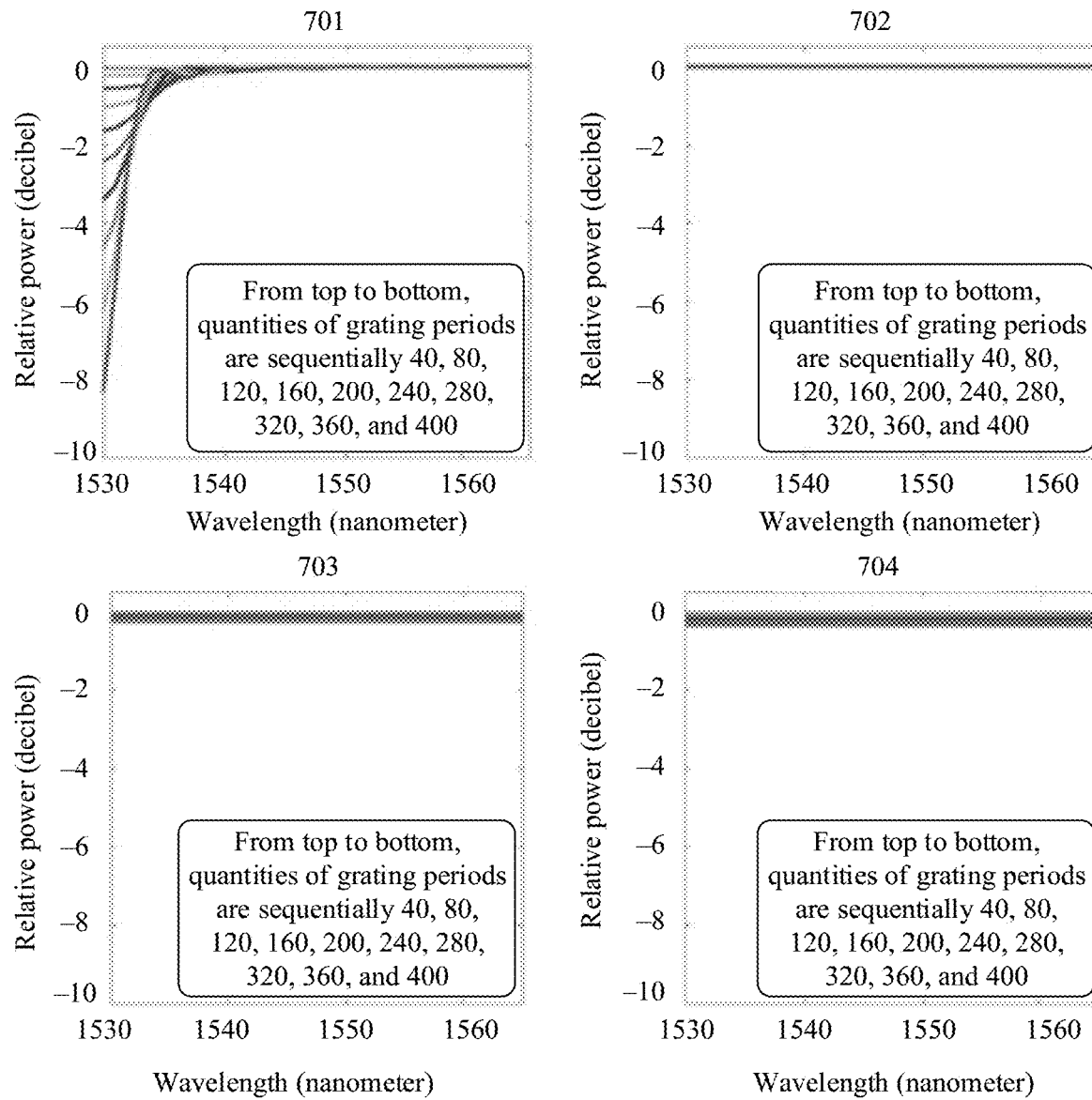
FIG. 7 is a first example diagram of a transmission spectrum according to this application.

The target fiber grating 601 having the foregoing quantity N of grating periods couples the first optical signal mode LP01 to obtain a transmission spectrum 701 shown in FIG. 7. An abscissa of the transmission spectrum 701 is a wavelength in a unit of nanometers (nm), and an ordinate thereof is relative power in a unit of decibels (dB). The relative power is a ratio of a value of optical power that is of the first optical signal mode LP01 and that is coupled to the second optical signal mode LP31, to a value of uncoupled optical power of the first optical signal mode LP01.

In view of the transmission spectrum 701, when the quantity N of grating periods has a different value, the first optical signal mode LP01 has a different attenuation curve under coupling action of the target fiber grating. For example, when N has the foregoing 10 values, ten attenuation curves shown in the transmission spectrum 701 can be obtained. The target fiber grating 601 having the quantity N of different grating periods can couple the optical power of the first optical signal mode LP01.

When the target fiber grating 601 transmits the first optical signal modes LP11, LP21, and LP02, transmission spectra of the first optical signal modes LP11, LP21, and LP02 are transmission spectra 702, 703, and 704 shown in FIG. 7, respectively. Attenuation curves of the first optical signal modes LP11, LP21, and LP02 hardly change with a value of the quantity N of grating periods of the target fiber grating 601. That is, when N has the foregoing 10 values, ten almost overlapping attenuation curves are obtained, as shown in the transmission spectra 702, 703 and 704.

Maximum relative powers of the first optical signal modes LP11, LP21, and LP02 are 0.027, 0.25, and 0.35, respectively. When the target fiber grating 601 couples the first optical signal mode LP01, the optical power of the first optical signal modes LP11, LP21, and LP02 is hardly interfered with.

Simulation Example 2

This simulation example is shown in combination with the foregoing coupling manner 2: The first optical signal mode LP11 transmitted by the fiber core is coupled to the second optical signal mode LP12. Specifically, in this simulation example, simulation is performed based on different values of the quantity N of grating periods of the target fiber grating 602. For description of a value of the quantity N of grating periods, refer to the foregoing simulation example 1. Details are not described again.

Figure 8:
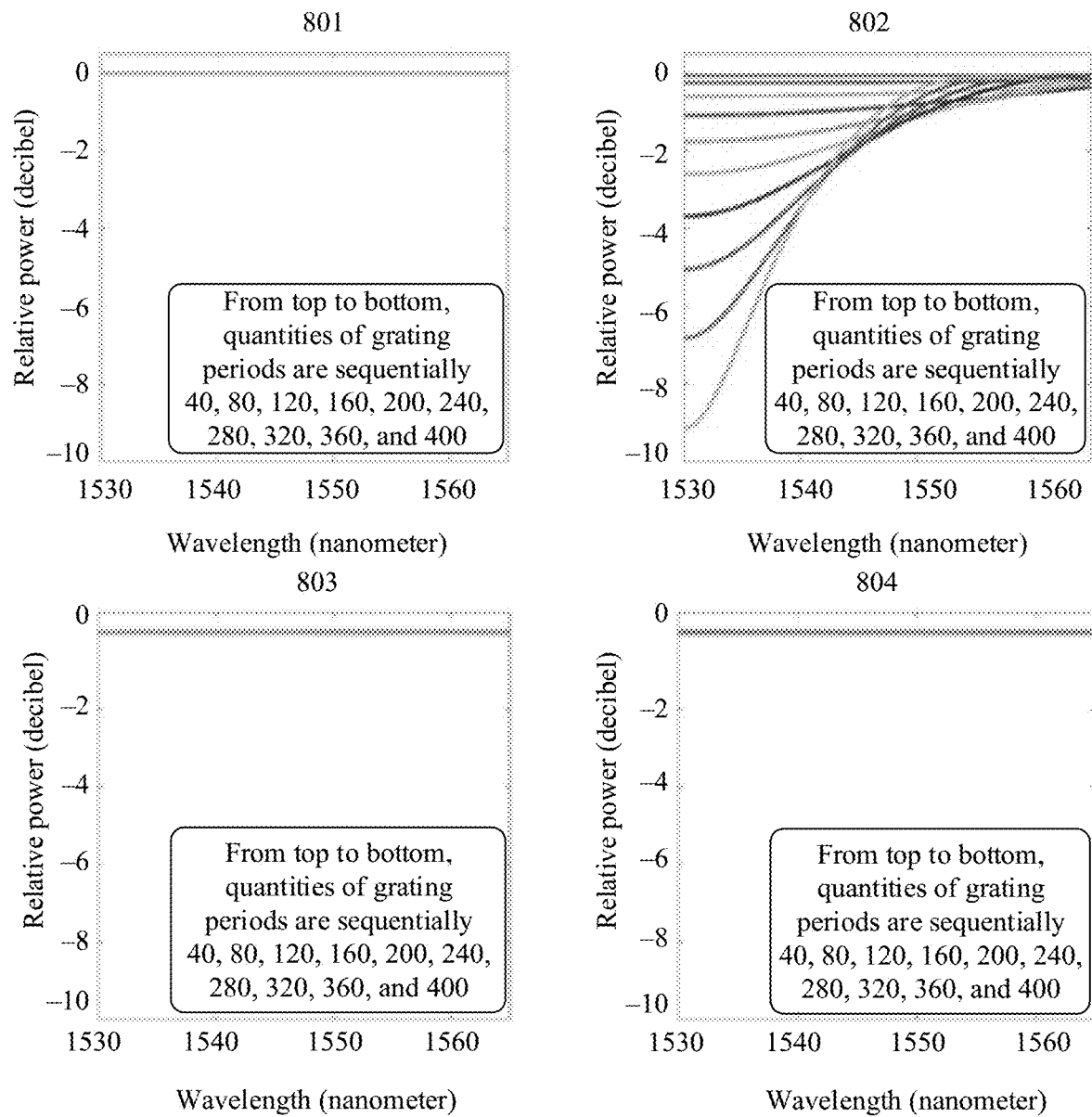
FIG. 8 is a second example diagram of a transmission spectrum according to this application.

The target fiber grating 602 having the foregoing quantity N of grating periods couples the first optical signal mode LP11 to obtain a transmission spectrum 802 shown in FIG. 8. For description of coordinates of the transmission spectrum 802, refer to the foregoing simulation example 1. Details are not described again.

In view of the transmission spectrum 802, when the quantity N of grating periods has a different value, the first optical signal mode LP11 has a different attenuation curve under coupling action of the target fiber grating 602. For example, when N has the foregoing 10 values, ten attenuation curves shown in the transmission spectrum 802 can be obtained. The target fiber grating 602 having the quantity N of different grating periods can couple the optical power of the first optical signal mode LP11.

When the target fiber grating 602 transmits the first optical signal modes LP01, LP21, and LP02, transmission spectra of the first optical signal modes LP01, LP21, and LP02 are transmission spectra 801, 803, and 804 shown in FIG. 8, respectively. Attenuation curves of the first optical signal modes LP01, LP21, and LP02 hardly change with a value of the quantity N of grating periods of the target fiber grating 602. That is, when N has the foregoing 10 values, ten almost overlapping attenuation curves are obtained, as shown in the transmission spectra 801, 803 and 804. Maximum relative powers of the first optical signal modes LP01, LP21, and LP02 are 0.0028, 0.06, and 0.07, respectively. When the target fiber grating 602 couples the first optical signal mode LP11, the optical power of the first optical signal modes LP01, LP21, and LP02 is not interfered with.

Simulation Example 3

This simulation example is shown in combination with the foregoing coupling manner 3: The first optical signal mode LP21 transmitted by the fiber core is coupled to the second optical signal mode LP03. Specifically, in this simulation example, simulation is performed based on different values of the quantity N of grating periods of the target fiber grating 603. For description of a value of the quantity N of grating periods, refer to the foregoing simulation example 1. Details are not described again.

Figure 9:
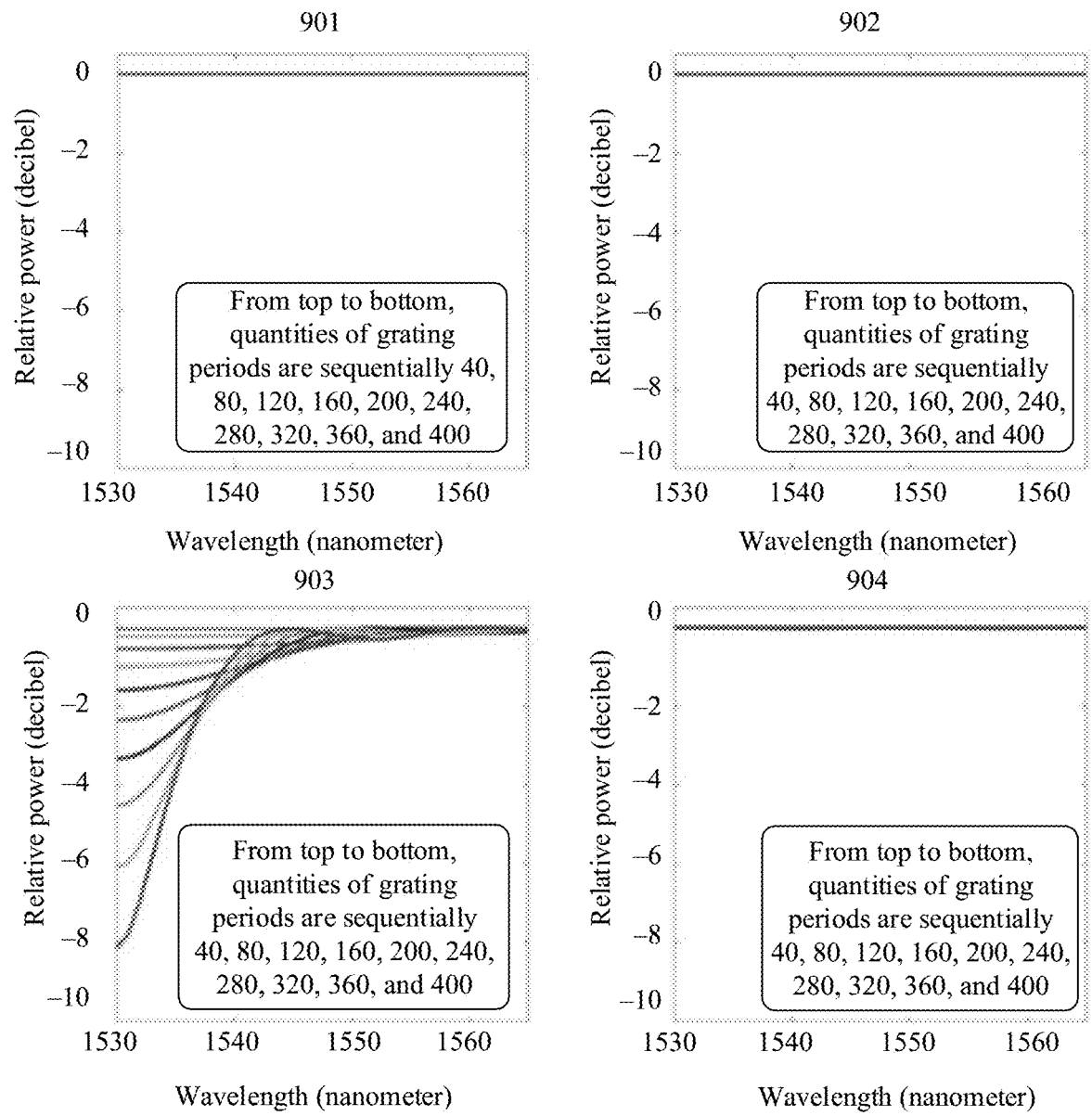
FIG. 9 is a third example diagram of a transmission spectrum according to this application.

The target fiber grating 603 having the foregoing quantity N of grating periods couples the first optical signal mode LP21 to obtain a transmission spectrum 903 shown in FIG. 9. For description of coordinates of the transmission spectrum 903, refer to the foregoing simulation example 1. Details are not described again.

In view of the transmission spectrum 903, when the quantity N of grating periods has a different value, the first optical signal mode LP21 has a different attenuation curve under coupling action of the target fiber grating 603. For example, when N has the foregoing 10 values, ten attenuation curves shown in the transmission spectrum 903 can be obtained. The target fiber grating 603 having the quantity N of different grating periods can couple the optical power of the first optical signal mode LP21.

When the target fiber grating 603 transmits the first optical signal modes LP01, LP11, and LP02, transmission spectra of the first optical signal modes LP01, LP11, and LP02 are transmission spectra 901, 902, and 904 shown in FIG. 9, respectively. Attenuation curves of the first optical signal modes LP01, LP11, and LP02 hardly change with a value of the quantity N of grating periods of the target fiber grating 603. That is, when N has the foregoing 10 values, ten almost overlapping attenuation curves are obtained, as shown in the transmission spectra 901, 902 and 904. Maximum relative powers of the first optical signal modes LP01, LP11, and LP02 are 0.002, 0.005, and 0.055, respectively. When the target fiber grating 603 couples the first optical signal mode LP21, the optical power of the first optical signal modes LP01, LP11, and LP02 is not interfered with.

Simulation Example 4

This simulation example is shown in combination with the foregoing coupling manner 4: The first optical signal mode LP02 transmitted by the fiber core is coupled to the second optical signal mode LP22. Specifically, in this simulation example, simulation is performed based on different values of the quantity N of grating periods of the target fiber grating 604. For description of a value of the quantity N of grating periods, refer to the foregoing simulation example 1. Details are not described again.

Figure 10:
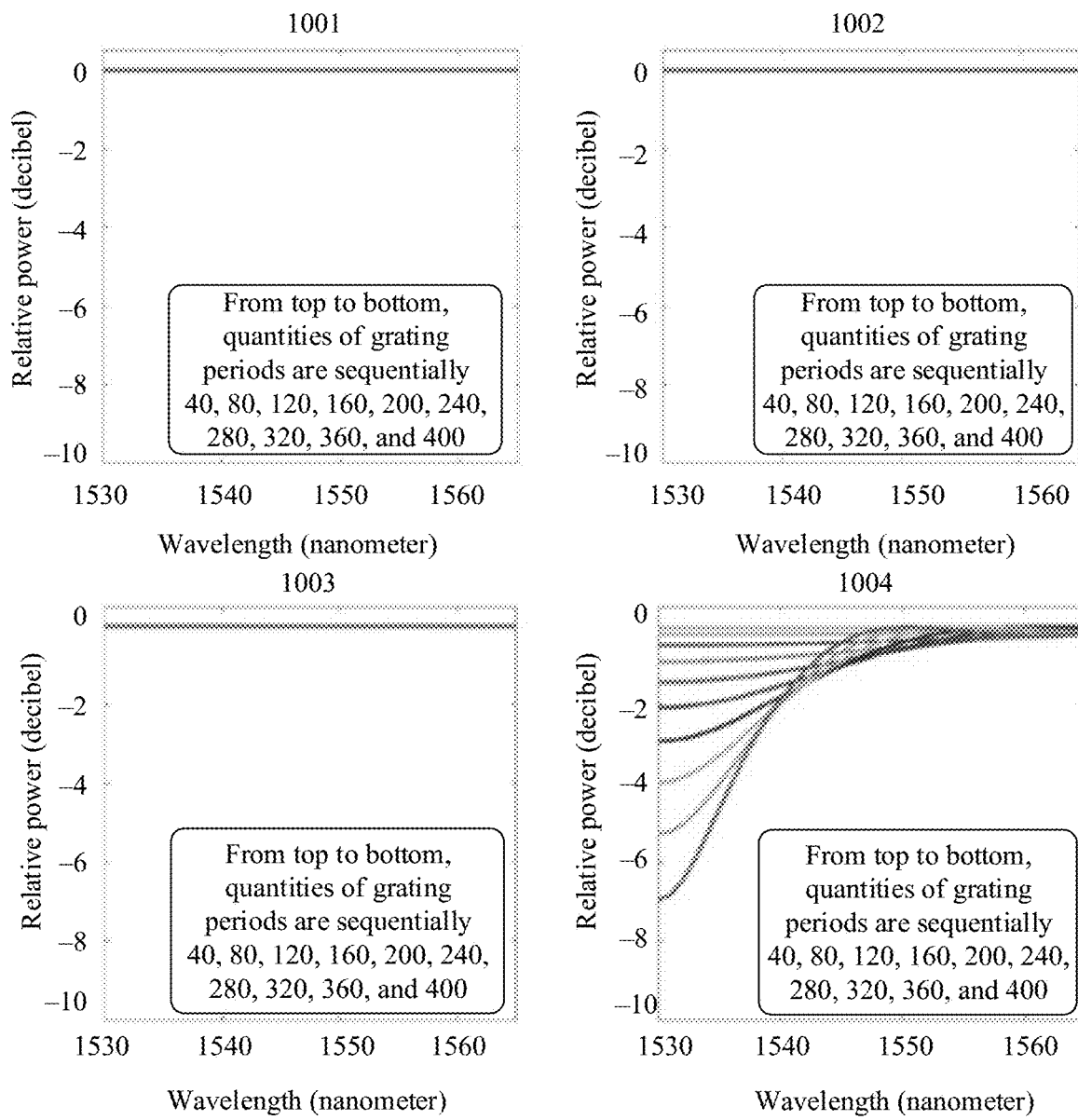
FIG. 10 is a fourth example diagram of a transmission spectrum according to this application.

The target fiber grating 604 having the foregoing quantity N of grating periods couples the first optical signal mode LP02 to obtain a transmission spectrum 1004 shown in FIG. 10. For description of coordinates of the transmission spectrum 1004, refer to the foregoing simulation example 1. Details are not described again.

In view of the transmission spectrum 1004, when the quantity N of grating periods has a different value, the first optical signal mode LP02 has a different attenuation curve under coupling action of the target fiber grating 604. For example, when N has the foregoing 10 values, ten attenuation curves shown in the transmission spectrum 1004 can be obtained. The target fiber grating 604 having the quantity N of different grating periods can couple the optical power of the first optical signal mode LP02.

When the target fiber grating 604 transmits the first optical signal modes LP01, LP11, and LP21, transmission spectra of the first optical signal modes LP01, LP11, and LP21 are transmission spectra 1001, 1002, and 1004 shown in FIG. 10, respectively. Attenuation curves of the first optical signal modes LP01, LP11, and LP21 hardly change with a value of the quantity N of grating periods of the target fiber grating 604. That is, when N has the foregoing 10 values, ten almost overlapping attenuation curves are obtained, as shown in the transmission spectra 1001, 1002 and 1004. Maximum relative powers of the first optical signal modes LP01, LP11, and LP21 are 0.001, 0.023, and 0.07, respectively. When the target fiber grating 604 couples the first optical signal mode LP02, the optical power of the first optical signal modes LP01, LP11, and LP21 is not interfered with.

Effects of gain equalization implemented by the optical fiber filter shown in this application scenario are verified through simulation as follows.

Figure 11:
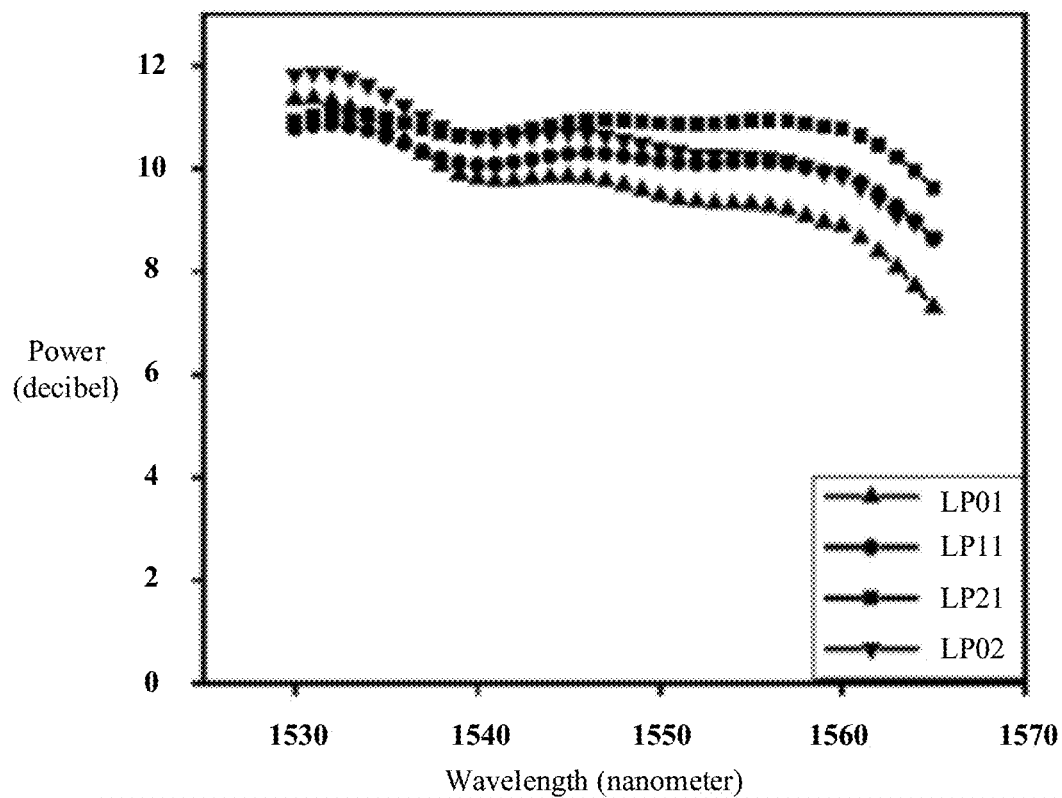
FIG. 11 is a first example diagram of a spectrogram according to this application.

FIG. 11 is a spectrogram of the four first optical signal modes LP01, LP11, LP21, and LP02 output by the gain fiber described above. An abscissa of the spectrogram represents a wavelength, and an ordinate thereof represents power. The first optical signal modes LP01, LP11, LP21, and LP02 are not filtered by the optical fiber filter. Power of each optical signal mode in the spectrogram has relatively large fluctuations, and a power difference between the optical signal modes is also relatively large. Equalization between the modes cannot be implemented.

Figure 12:
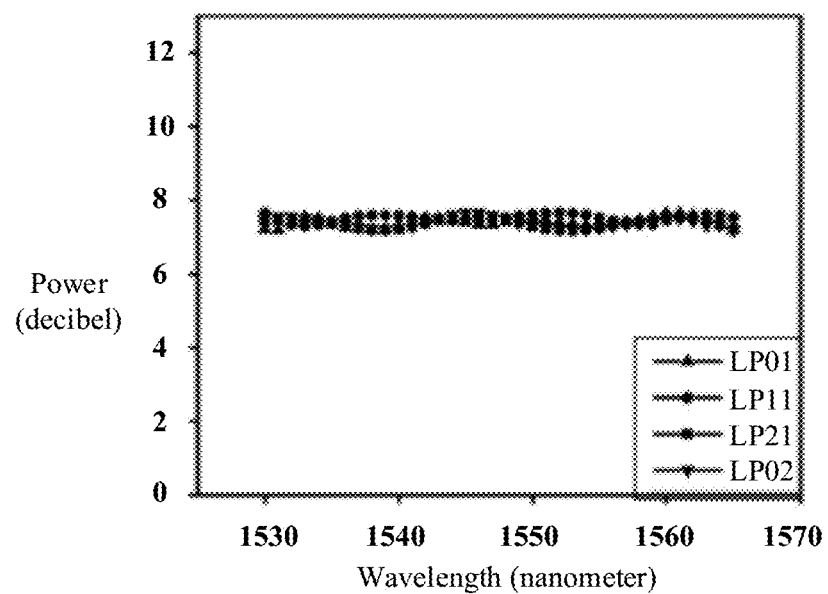
FIG. 12 is a second example diagram of a spectrogram according to this application.

FIG. 12 is a spectrogram obtained after the four optical signal modes output by the gain fiber are filtered by the optical fiber filter. The first optical signal modes LP01, LP11, LP21, and LP02 have been filtered by the optical fiber filter, and power of each optical signal mode in the spectrogram has quite small fluctuations. As shown in FIG. 12, a ratio of a maximum power value to a minimum power value of each optical signal mode is less than 0.47, a power difference between the optical signal modes is very small, and equalization is substantially maintained.

Based on the optical fiber filter shown in this application scenario, the optical power of the four first optical signal modes LP01, LP11, LP21, and LP02 output by the gain fiber can be adjusted to implement gain equalization between different first optical signal modes.

Figure 13:
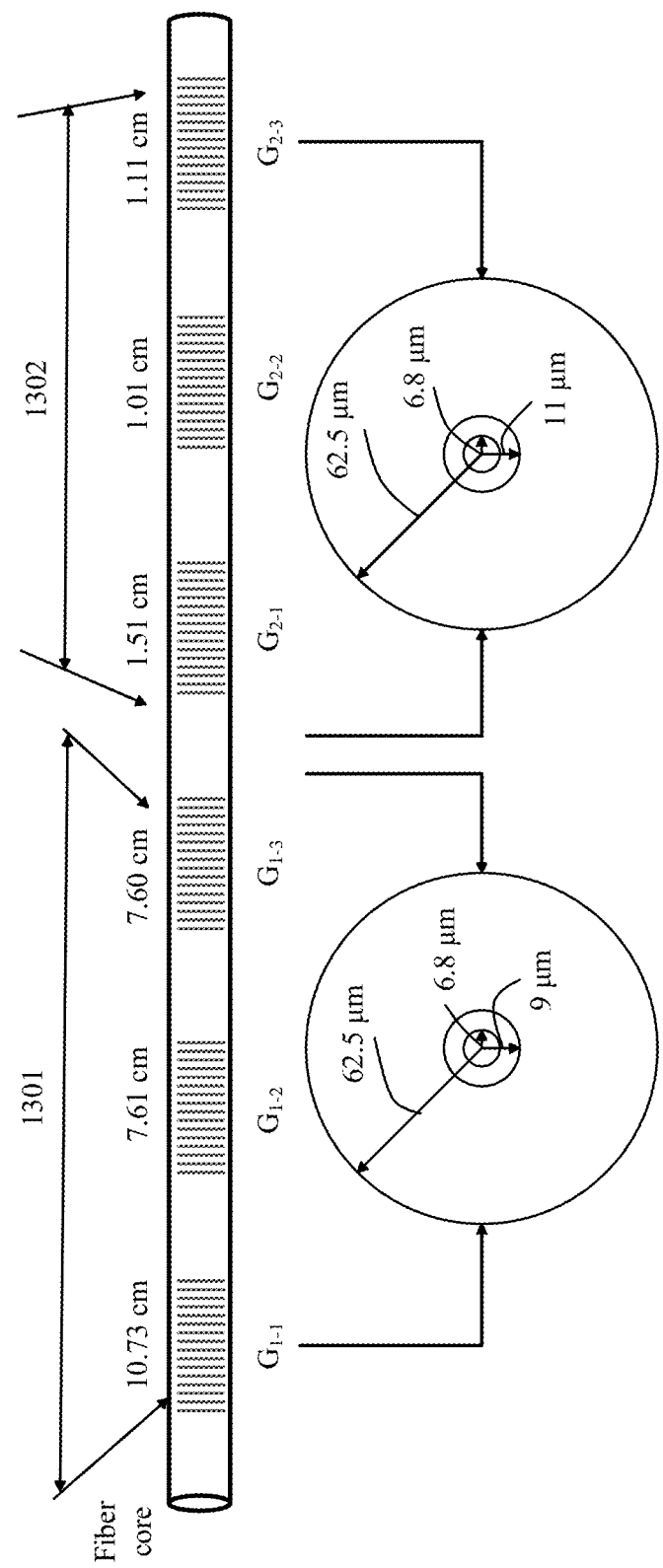
FIG. 13 is a fourth example diagram of a structure of an optical fiber filter according to this application.

Application Scenario 2:

This application scenario is described with reference to FIG. 13. In this application scenario, for example, a quantity of the optical signal modes transmitted by the fiber core is not equal to a quantity of the second optical signal modes transmitted by the inner cladding. Specifically, the fiber core transmits two optical signal modes: LP01 and LP11. The second optical signal modes transmitted by the inner cladding are LP21, LP02, LP12, and LP31. The first optical signal mode LP01 transmitted by the fiber core is coupled to the second optical signal mode LP21 based on phase matching, and the first optical signal mode LP11 transmitted by the fiber core is coupled to the second optical signal mode LP02 based on phase matching.

In this embodiment, that power of different optical signal modes is adjusted based on different structural parameters is used as an example. First structural parameters are used to couple the first optical signal mode LP01, and second structural parameters are used to couple the first optical signal mode LP11. The first structural parameters are as follows: The radius of the fiber core is 6.8 μm, the radius of the inner cladding is 9.0 μm, and the radius of the outer cladding is 62.5 μm. The refractive index of the fiber core is 1.4536, the refractive index of the inner cladding is 1.4473, and the refractive index of the outer cladding is 1.44402. The second structural parameters are as follows: The radius of the fiber core is 6.8 μm, the radius of the inner cladding is 11.0 μm, and the radius of the outer cladding is 62.5 μm. The refractive index of the fiber core is 1.4536, the refractive index of the inner cladding is 1.4473, and the refractive index of the outer cladding is 1.44402. Specific coupling manners are described below:

Coupling Manner 1

Coupling of the first optical signal mode LP01 transmitted by the fiber core to the second optical signal mode LP21 is specifically described with reference to FIG. 13 and Table 6.

TABLE 6

| | Sub-grating of the target fiber grating | Λ (cm) | N | L (cm) | Center wavelength (nm) |
|---|---|---|---|---|---|
| Coupling of the first optical signal mode LP01 | $G_{1-1}$ | 0.28240 | 28 | 10.73 | 1530 |
| | $G_{1-2}$ | 0.28188 | 27 | 7.61 | 1545 |
| | $G_{1-3}$ | 0.28156 | 27 | 7.60 | 1555 |

The first optical signal mode LP01 is coupled by using the target fiber grating 1301. The first optical signal mode LP01 includes three first optical signals, and center wavelengths of the three first optical signals are 1530 nm, 1545 nm, and 1555 nm shown in Table 6, respectively.

The target fiber grating 1301 includes three sub-gratings: $G_{1-1}$, $G_{1-2}$, and $G_{1-3}$. For a grating period of each sub-grating, a quantity of grating periods, and a length, refer to Table 6.

Specifically, the sub-grating $G_{1-1}$ can couple at least part of optical power of the first optical signal with the center wavelength of 1530 nm to the second optical signal mode LP21 based on phase matching. For specific description of the phase matching, refer to the foregoing description. Details are not described again. By analogy, the sub-grating $G_{1-3}$ can couple at least part of optical power of the first optical signal with the center wavelength of 1555 nm to the second optical signal mode LP21.

Coupling Manner 2

Coupling of the first optical signal mode LP11 transmitted by the fiber core to the second optical signal mode LP02 is specifically described with reference to FIG. 13 and Table 7.

TABLE 7

| | Sub-grating of the target fiber grating | Λ (cm) | N | L (cm) | Center wavelength (nm) |
|---|---|---|---|---|---|
| Coupling of the first optical signal mode LP11 | $G_{2-1}$ | 0.08364 | 18 | 1.51 | 1530 |
| | $G_{2-2}$ | 0.08449 | 12 | 1.01 | 1545 |
| | $G_{2-3}$ | 0.08507 | 13 | 1.11 | 1555 |

The first optical signal mode LP11 is coupled by using the target fiber grating 1302. The first optical signal mode LP11 includes three first optical signals, and center wavelengths of the three first optical signals are 1530 nm, 1545 nm, and 1555 nm shown in Table 7, respectively.

The target fiber grating 1302 includes three sub-gratings: $G_{2-1}$, $G_{2-2}$, and $G_{2-3}$. For the grating period of each sub-grating, the quantity of grating periods, the length, and the center wavelength, refer to Table 7.

Specifically, the sub-grating $G_{2-1}$ can couple at least part of optical power of the first optical signal with the center wavelength of 1530 nm to the second optical signal mode LP02 based on phase matching. For specific description of the phase matching, refer to the foregoing description. Details are not described again. By analogy, the sub-grating $G_{2-3}$ can couple at least part of optical power of the first optical signal with the center wavelength of 1555 nm to the second optical signal mode LP02.

If the fiber core includes the target fiber grating 1301 and the target fiber grating 1302 that are cascaded, gain equalization of an entire C-band (1530 nm to 1565 nm) can be implemented. Moreover, each target fiber grating can independently adjust the optical power of each first optical signal mode, and mutual interference is effectively avoided. For specific description of related interference, refer to the foregoing application scenario 1. Details are not described again. Effects of gain equalization implemented by the optical fiber filter shown in this application scenario are verified through simulation as follows.

Figure 14:
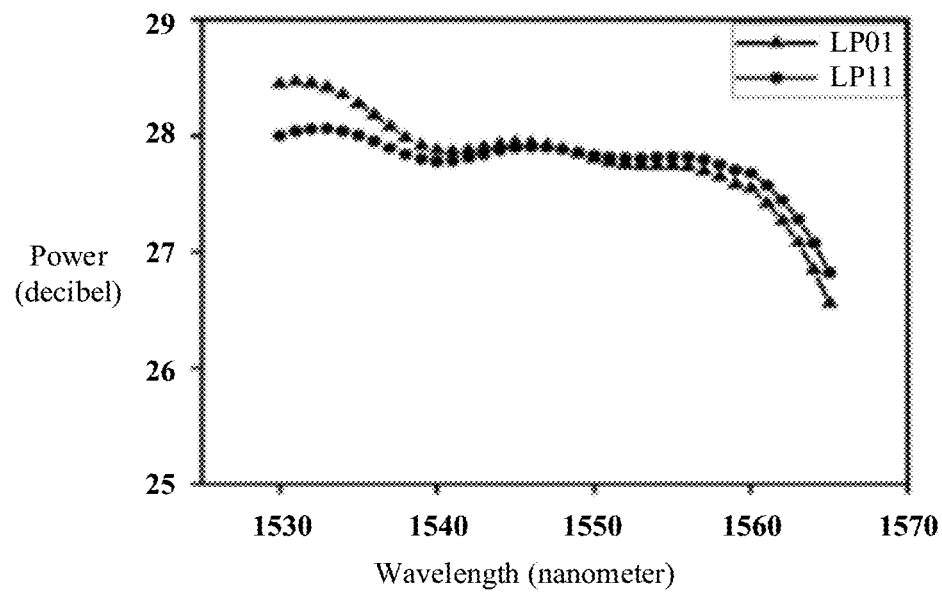
FIG. 14 is a third example diagram of a spectrogram according to this application.

FIG. 14 is a spectrogram of the two first optical signal modes LP01 and LP11 output by the gain fiber described above. For description of coordinates of the spectrogram, refer to FIG. 11. Details are not described again. The first optical signal modes LP01 and LP11 are not filtered by the optical fiber filter, and power of each first optical signal mode in the spectrogram has relatively large fluctuations.

Figure 15:
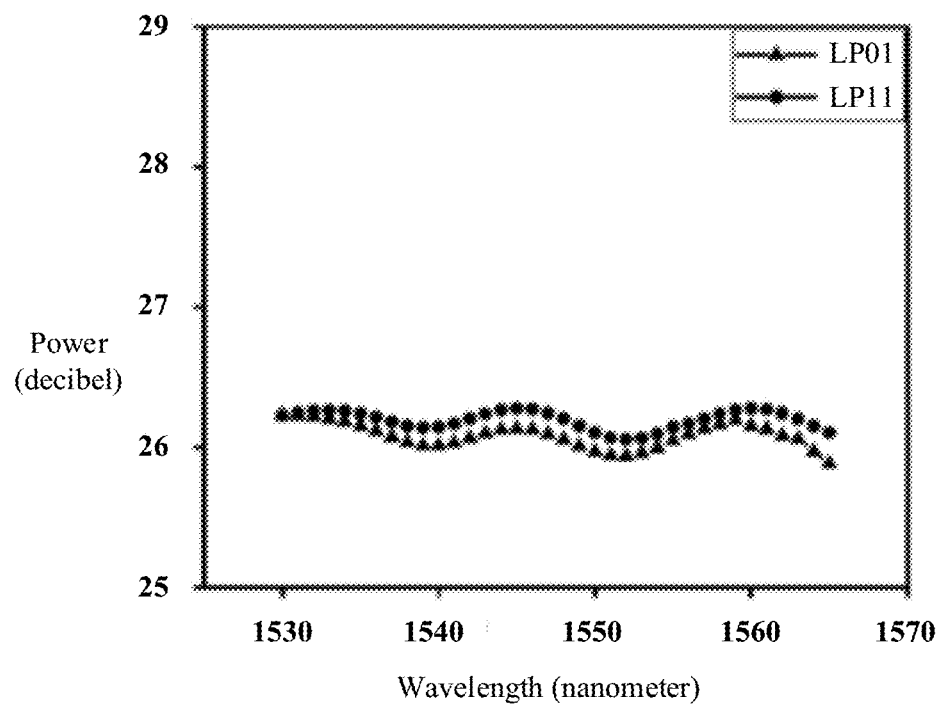
FIG. 15 is a fourth example diagram of a spectrogram according to this application.

FIG. 15 is a spectrogram of the two first optical signal modes LP01 and LP11 output by the gain fiber. The first optical signal modes LP01 and LP11 have been filtered by the optical fiber filter, and power of each first optical signal mode in the spectrogram has quite small fluctuations. As shown in FIG. 15, a ratio of a maximum power value to a minimum power value of each first optical signal mode is less than 0.5.

Based on the foregoing description, effective effects of the optical fiber filter shown in this application are described below:

The optical fiber filter shown in embodiments can be used to independently adjust optical power of two or more first optical signal modes, thereby effectively implementing gain equalization between different optical signal modes and gain equalization between first optical signals with different wavelengths in the different optical signal modes, and effectively reducing a probability of interruption of optical signal transmission.

Adjusting the optical power of the target first optical signal mode based on the target fiber grating does not interfere with optical power of other first optical signals, thereby effectively avoiding interference.

The target fiber grating of the optical fiber filter can couple at least part of the optical power of the target first optical signal mode to one target second optical signal mode, and the target second optical signal mode is only one of the optical signal modes supported by the inner cladding. Optical power of a same target first optical signal mode is not coupled to a plurality of second optical signal modes, thereby implementing controllable adjustment of the optical power of the target first optical signal mode, and effectively improving adjustment precision of the optical power of the target first optical signal mode.

In the optical fiber filter, the optical power is coupled based on the fiber grating in the fiber core, and the fiber grating has advantages of a simple structure, a small insertion loss, a small volume, low costs, and the like.

In the specification, claims, and the accompanying drawings of this application, the terms "first", "second", and the like are intended to distinguish between similar objects but do not necessarily indicate a specific order or sequence. It should be understood that the data used in such a way are interchangeable in appropriate cases so that embodiments described herein can be implemented in an order other than the order illustrated or described herein. In addition, terms "include", "comprise", and any variation thereof are intended to cover non-exclusive inclusions, for example, a process, method, system, product, or device including a series of steps or modules is unnecessarily limited to those clearly listed steps or modules, but may include other steps or modules that are not clearly listed or are inherent to these processes, methods, products, or devices.

The foregoing embodiments are merely intended for describing technical solutions of this application rather than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of technical solutions of this application.

What is claimed is:

1. An optical fiber filter, comprising:
   a fiber core, wherein at least one fiber grating is etched on the fiber core;
   an inner cladding, wherein the inner cladding is wrapped around an outer peripheral surface of the fiber core; and
   an outer cladding, wherein the outer cladding is wrapped around an outer peripheral surface of the inner cladding;
   wherein a refractive index of the fiber core, a refractive index of the inner cladding, and a refractive index of the outer cladding progressively decrease in sequence;
   wherein the fiber core is configured to transmit at least two mutually different first optical signal modes;
   wherein the inner cladding is configured to transmit at least two mutually different second optical signal modes;
   wherein at least part of optical power of a target first optical signal mode is coupled to only a target second optical signal mode at the at least one fiber grating;
   wherein the target first optical signal mode is one of the at least two first optical signal modes, and the target second optical signal mode is one of the at least two second optical signal modes.

2. The optical fiber filter according to claim 1, wherein the target first optical signal mode and the target second optical signal mode are coupled to satisfy the following formula:

$$|(n_{eff_m} - n_{eff_n})| = \frac{\lambda}{\Lambda},$$

wherein $n_{eff_m}$ is an effective refractive index of one first optical signal comprised in the target first optical signal mode, $n_{eff_n}$ is an effective refractive index of one second optical signal comprised in the target second optical signal mode, $\lambda$ is a wavelength of the first optical signal and the second optical signal, and $\Lambda$ is a grating period of the at least one fiber grating.

3. The optical fiber filter according to claim 1, wherein the target first optical signal mode and the target second optical signal mode are coupled to satisfy the following formula:

$$90\% < \frac{|(n_{eff_m} - n_{eff_n})| * \Lambda}{\lambda} < 110\%,$$

wherein $n_{eff_m}$ is an effective refractive index of one first optical signal comprised in the target first optical signal mode, $n_{eff_n}$ is an effective refractive index of one second optical signal comprised in the target second optical signal mode, $\lambda$ is a wavelength of the first optical signal and the second optical signal, and $\Lambda$ is a grating period of the at least one fiber grating.

4. The optical fiber filter according to claim 1, wherein a plurality of fiber gratings are etched on the fiber core, and grating periods of the fiber gratings are different from each other.

5. The optical fiber filter according to claim 1, wherein the at least two first optical signal modes correspond to different second optical signal modes.

6. The optical fiber filter according to claim 1, wherein each of the at least two first optical signal modes corresponds to a respective second optical signal mode.

7. The optical fiber filter according to claim 1, wherein each of the at least two first optical signal modes except a first optical signal mode corresponding to lowest optical power corresponds to a respective second optical signal mode.

8. The optical fiber filter according to claim 1, wherein a length of the at least one fiber grating in an axial direction of the fiber core is positively correlated to a value of optical power coupled to the target second optical signal mode.

9. The optical fiber filter according to claim 1, wherein optical power, of the target first optical signal mode, that has been coupled to the outer cladding is less than optical power, of the target first optical signal mode, that has been coupled to the target second optical signal mode.

10. The optical fiber filter according to claim 1, wherein a difference between the refractive index of the inner cladding and the refractive index of the outer cladding is positively correlated to a quantity of the second optical signal modes.

11. The optical fiber filter according to claim 1, wherein a value of a radius of the inner cladding is positively correlated to the quantity of the second optical signal modes.

12. An optical fiber amplifier, comprising:
a pump laser;
a wavelength division multiplexer;
a gain fiber; and
an optical fiber filter;
wherein the wavelength division multiplexer is coupled to each of the pump laser and the gain fiber, and the gain fiber is coupled to the optical fiber filter;
wherein the wavelength division multiplexer is configured to multiplex pump light from the pump laser and an optical signal;
wherein the gain fiber is configured to perform gain amplification on the optical signal from the wavelength division multiplexer to output at least two first optical signal modes;
wherein the optical fiber filter comprises a fiber core, an inner cladding, and an outer cladding, wherein the inner cladding is wrapped around an outer peripheral surface of the fiber core, wherein the outer cladding is wrapped around an outer peripheral surface of the inner cladding, wherein a refractive index of the fiber core, a refractive index of the inner cladding, and a refractive index of the outer cladding progressively decrease in sequence, wherein the fiber core is configured to transmit at least two mutually different first optical signal modes, wherein the inner cladding is configured to transmit at least two mutually different second optical signal modes, and wherein at least one fiber grating is etched on the fiber core; and
wherein at least part of optical power of a target first optical signal mode is coupled to only a target second optical signal mode at the at least one fiber grating, wherein the target first optical signal mode is one of the at least two first optical signal modes, and the target second optical signal mode is one of the at least two second optical signal modes.

13. The optical fiber amplifier according to claim 12, wherein the target first optical signal mode and the target second optical signal mode are coupled to satisfy the following formula:

$$\left|(n_{\mathit{eff}_m} - n_{\mathit{eff}_n})\right| = \frac{\lambda}{\Lambda},$$

wherein $n_{\mathit{eff}_m}$ is an effective refractive index of one first optical signal comprised in the target first optical signal mode, $n_{\mathit{eff}_n}$ is an effective refractive index of one second optical signal comprised in the target second optical signal mode, $\lambda$ is a wavelength of the first optical signal and the second optical signal, and $\Lambda$ is a grating period of the at least one fiber grating.

14. The optical fiber amplifier according to claim 12, wherein the target first optical signal mode and the target second optical signal mode are coupled to satisfy the following formula:

$$90\% < \frac{\left|(n_{\mathit{eff}_m} - n_{\mathit{eff}_n})\right| * \Lambda}{\lambda} < 110\%,$$

wherein $n_{\mathit{eff}_m}$ is an effective refractive index of one first optical signal comprised in the target first optical signal mode, $n_{\mathit{eff}_n}$ is an effective refractive index of one second optical signal comprised in the target second optical signal mode, $\lambda$ is a wavelength of the first optical signal and the second optical signal, and $\Lambda$ is a grating period of the at least one fiber grating.

15. The optical fiber amplifier according to claim 12, wherein a plurality of fiber gratings are etched on the fiber core, and grating periods of the fiber gratings are different from each other.

16. The optical fiber amplifier according to claim 12, wherein the at least two first optical signal modes correspond to different second optical signal modes.

17. The optical fiber amplifier according to claim 12, wherein each of the at least two first optical signal modes corresponds to a respective second optical signal mode.

18. The optical fiber amplifier according to claim 12, wherein a length of the at least one fiber grating in an axial direction of the fiber core is positively correlated to a value of optical power coupled to the target second optical signal mode.

19. The optical fiber amplifier according to claim 12, wherein a difference between the refractive index of the inner cladding and the refractive index of the outer cladding is positively correlated to a quantity of the second optical signal modes.

20. The optical fiber amplifier according to claim 12, wherein a value of a radius of the inner cladding is positively correlated to the quantity of the second optical signal modes.

* * * * *